US012573017B2

(12) United States Patent
Chen et al.

(10) Patent No.: US 12,573,017 B2
(45) Date of Patent: Mar. 10, 2026

(54) METHOD OF TUNING PARAMETERS FOR IMAGE SIGNAL PROCESSING AND CAMERA SYSTEM

(71) Applicant: MEDIATEK INC., Hsinchu City (TW)

(72) Inventors: Ding-Yun Chen, Hsinchu City (TW);
Chin-Yuan Tseng, Hsinchu City (TW);
Tsung-Han Chan, Hsinchu City (TW);
Ming-Feng Tien, Hsinchu City (TW);
Yi-Ping Liu, Hsinchu City (TW);
Yi-Hsuan Huang, Hsinchu City (TW);
Cheng-Tsai Ho, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 361 days.

(21) Appl. No.: 18/337,170

(22) Filed: Jun. 19, 2023

(65) Prior Publication Data

US 2024/0420297 A1 Dec. 19, 2024

(51) Int. Cl.
G06T 7/00 (2017.01)
G06V 10/54 (2022.01)
G06V 10/56 (2022.01)
G06V 10/60 (2022.01)

(52) U.S. Cl.
CPC ............ G06T 7/0002 (2013.01); G06V 10/54 (2022.01); G06V 10/56 (2022.01); G06V 10/60 (2022.01); *G06T 2207/10024* (2013.01); *G06T 2207/30168* (2013.01)

(58) Field of Classification Search
CPC ......... G06T 7/0002; G06T 2207/10024; G06T 2207/30168; G06V 10/54; G06V 10/56; G06V 10/60
USPC ........................................................ 382/112
See application file for complete search history.

(56) References Cited

U.S. PATENT DOCUMENTS

2016/0309063 A1* 10/2016 Choudhary ............ H04N 23/62
2016/0309076 A1* 10/2016 Steinberg .............. G06F 1/1692
2017/0303043 A1* 10/2017 Young .................. H04N 23/633
2020/0322530 A1* 10/2020 Choi ...................... G06V 10/10
2020/0381125 A1* 12/2020 Hao ........................ G16H 50/50
2022/0237410 A1* 7/2022 Wrenninge ............ G06V 20/56
2023/0090222 A1* 3/2023 Swett ................ G06Q 30/0625
705/26.62
2025/0225632 A1* 7/2025 Inaishi ..................... G01H 3/06

* cited by examiner

*Primary Examiner* — Ali Bayat
(74) *Attorney, Agent, or Firm* — McClure, Qualey & Rodack, LLP

(57) ABSTRACT
A method of tuning parameters for image signal processing is provided. The method includes capturing at least one raw image. The method further includes generating a first rendered image by rendering the raw image based on a first parameter value set, and generating a second rendered image by rendering the raw image based on a second parameter value set. The method further includes calculating a first image quality score set for the first rendered image, and calculating a second image quality score set for the second rendered image. The method further includes generating a third parameter value set based on the first parameter value set, the second parameter value set, the first image quality score set, and the second image quality score set.

18 Claims, 16 Drawing Sheets

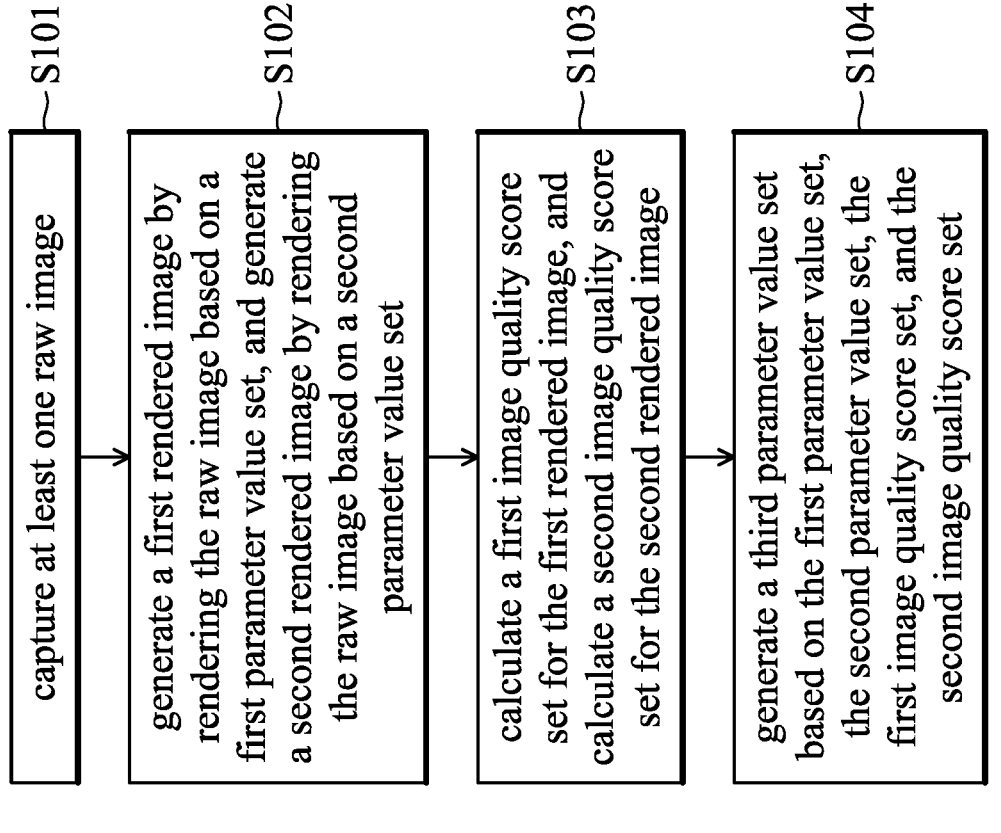

100 capture at least one raw image ~S101 generate a first rendered image by rendering the raw image based on a first parameter value set, and generate a second rendered image by rendering the raw image based on a second parameter value set ~S102 calculate a first image quality score set for the first rendered image, and calculate a second image quality score set for the second rendered image ~S103 generate a third parameter value set based on the first parameter value set, the second parameter value set, the first image quality score set, and the second image quality score set ~S104

FIG. 1A calculate an estimated value by using an optimization algorithm to interpolate or extrapolate the first parameter value and the second parameter value based on the first image quality score set and the second image quality score set ～S301 set the third parameter value equal to the estimated value ～S302

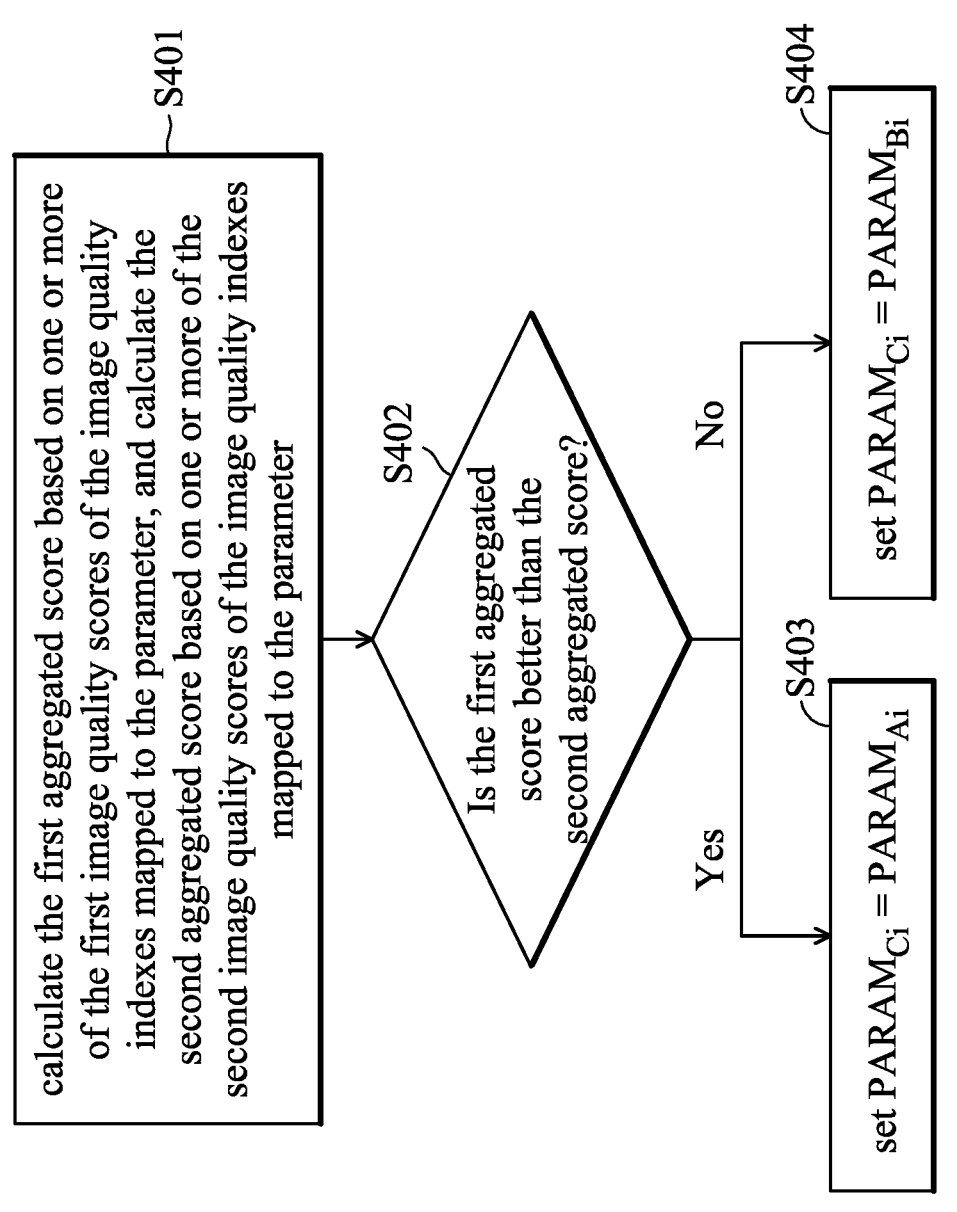

calculate the first aggregated score based on one or more of the first image quality scores of the image quality indexes mapped to the parameter, and calculate the second aggregated score based on one or more of the second image quality scores of the image quality indexes mapped to the parameter

S401

Is the first aggregated score better than the second aggregated score?

S402

Yes

No set $PARAM_{Ci} = PARAM_{Ai}$

S403 set $PARAM_{Ci} = PARAM_{Bi}$

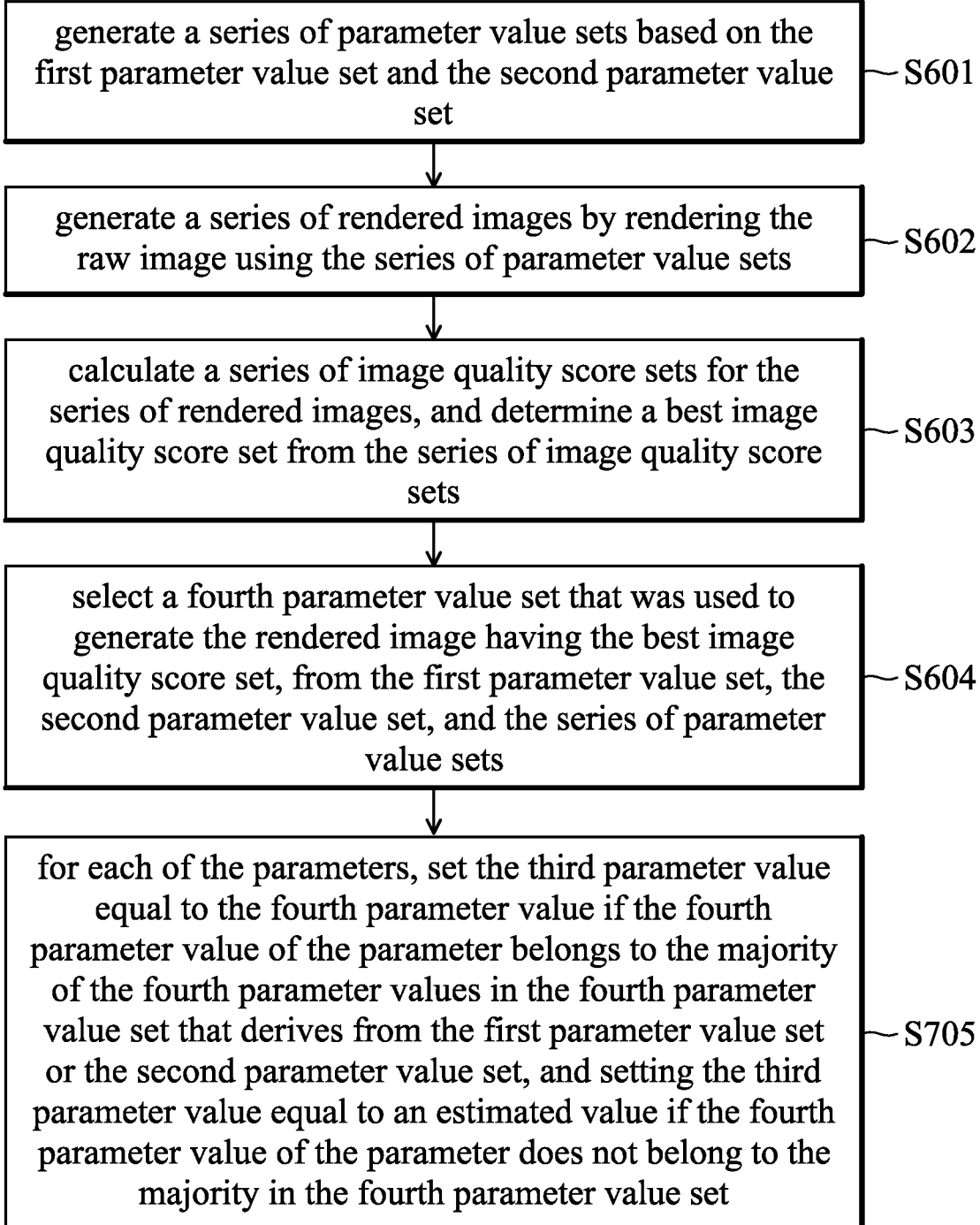

generate a series of parameter value sets based on the first parameter value set and the second parameter value set — S601 generate a series of rendered images by rendering the raw image using the series of parameter value sets — S602 calculate a series of image quality score sets for the series of rendered images, and determine a best image quality score set from the series of image quality score sets — S603 select a fourth parameter value set that was used to generate the rendered image having the best image quality score set, from the first parameter value set, the second parameter value set, and the series of parameter value sets — S604 for each of the parameters, set the third parameter value equal to the fourth parameter value if the fourth parameter value of the parameter belongs to the majority of the fourth parameter values in the fourth parameter value set that derives from the first parameter value set or the second parameter value set, and setting the third parameter value equal to an estimated value if the fourth parameter value of the parameter does not belong to the majority in the fourth parameter value set — S705

FIG. 7

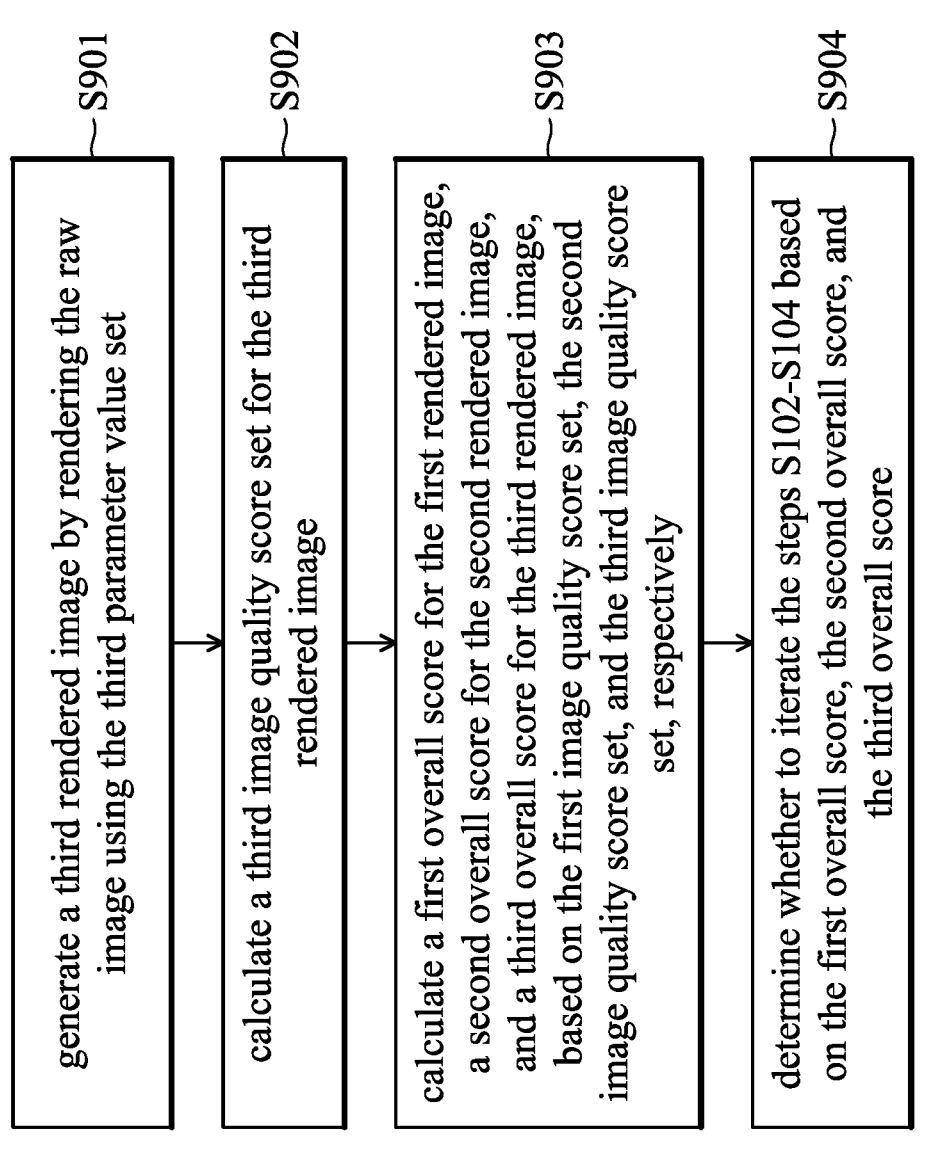

generate a third rendered image by rendering the raw image using the third parameter value set ⌐S901 calculate a third image quality score set for the third rendered image ⌐S902 calculate a first overall score for the first rendered image, a second overall score for the second rendered image, and a third overall score for the third rendered image, based on the first image quality score set, the second image quality score set, and the third image quality score set, respectively ⌐S903 determine whether to iterate the steps S102-S104 based on the first overall score, the second overall score, and the third overall score ⌐S904

FIG. 9

METHOD OF TUNING PARAMETERS FOR IMAGE SIGNAL PROCESSING AND CAMERA SYSTEM

CROSS REFERENCE TO RELATED APPLICATIONS

Background of the Invention

Field of the Invention

The present disclosure relates in general to image signal processing technologies, and it relates particularly to a method of tuning parameters for image signal processing, and a camera system.

Description of the Related Art

A camera system includes image signal processors to convert one or more raw images captured from image sensors into a processed image. The image signal processing process involves many image processing algorithms, such as demosaicing, noise reduction (denoising), edge enhancement, etc. Most of these algorithms have tunable parameters. Each of the parameters affects different aspects of image quality (IQ), such as noise, texture, artifact, tone, contrast, dynamic range, color, brightness, etc. Each of the aspects of IQ has objective metrics, namely IQ scores. For example, the IQ scores for artifact includes overshoot/undershoot, contour, edge noise, pattern noise, etc., and IQ scores for temporal quality includes temporal smooth, temporal noise, flicker, ghost, etc. To achieve the best image quality, the parameters should be adapted to different image sensors, different lighting condition, and/or different scenarios.

In practice, there is trade-off between the parameter sets. Therefore, there is no optimal combination of parameter values that satisfy all scenarios. For example, higher gain (ISO) helps provide enough brightness to capture an image in lower lighting conditions, but there will be more noise in the captured image as well, so the parameter values for the denoising algorithm should also be tuned. However, the tuning of parameter values for the denoising algorithm may also cause other side-effects, such as loss texture, artifact (contour, pattern noise, etc.), and other parameter values should be tuned as well. Therefore, it is usually needed to consider and reconcile various aspects of image quality when tuning the parameters.

Therefore, there is a need for a method of tuning parameters for image signal processing.

BRIEF SUMMARY OF THE INVENTION

An embodiment of the present disclosure provides a method of tuning parameters for image signal processing. The method is for use in a camera system. The method includes step (i) of capturing at least one raw image. The method further includes step (ii) of generating a first rendered image by rendering the raw image based on a first parameter value set, and generating a second rendered image by rendering the raw image based on a second parameter value set. The first parameter value set includes first parameter values of multiple parameters, and the second parameter value set includes second parameter values of the parameters. The method further includes step (iii) of calculating a first image quality score set for the first rendered image, and calculating a second image quality score set for the second rendered image. The first image quality score set includes first image quality scores of one or more image quality indexes, and the second image quality score set includes second image quality scores of the image quality indexes. The method further includes step (iv) of generating a third parameter value set based on the first parameter value set, the second parameter value set, the first image quality score set, and the second image quality score set. The third parameter value set includes third parameter values of the parameters.

In an embodiment, each parameter is mapped to only one of the image quality indexes, and step (iv) further includes determining, for each of the parameters, whether to set the third parameter value equal to the first parameter value or the second parameter value of the parameter by comparing the first image quality score and the second image quality score of said only one image quality index.

In an embodiment, each parameter is mapped to one or more of the image quality indexes, and step (iv) further includes calculating an estimated value by using an optimization algorithm to interpolate or extrapolate the first parameter value and the second parameter value based on the first image quality score set and the second image quality score set, for each of the parameters. Additionally, step (iv) further includes setting the third parameter value equal to the estimated value.

In an embodiment, each parameter is mapped to one or more of the image quality indexes, and step (iv) further includes calculating a first aggregated score based on one or more of the first image quality scores of the image quality indexes mapped to the parameter, and calculating a second aggregated score based on one or more of the second image quality scores of the image quality indexes mapped to the parameter, for each of the parameters. Additionally, step (iv) further includes determining whether to set the third parameter value equal to the first parameter value or the second parameter value of the parameter by comparing the first aggregated score and the second aggregated score.

In an embodiment, each parameter is mapped to one or more of the image quality indexes, and step (iv) further includes, for each of the parameters, checking a mapping table to determine whether the parameter is mapped to only one of the image quality indexes. The mapping table is associated with mappings between the image quality indexes and the parameters. In response to the parameter being mapped to said only one image quality index, determining whether to set the third parameter value equal to the first parameter value or the second parameter value of the parameter by comparing the first image quality score and the second image quality score of said only one image quality index. In response to the parameter being mapped to multiple image quality indexes, step (iv) further includes calculating an estimated value by using an optimization algorithm to interpolate or extrapolate the first parameter value and the second parameter value based on the first image quality score set and the second image quality score set, and setting the third parameter value equal to the estimated value.

In an embodiment, step (iv) further includes, for each of the parameters, calculating the estimated value by using an optimization algorithm to interpolate or extrapolate the first parameter value and the second parameter value based on the first image quality score set and the second image quality score set.

In an embodiment, step (iv) further includes generating a series of parameter value sets based on the first parameter value set and the second parameter value set. The series of parameter value sets includes possible combinations of selecting one parameter value from each of the first parameter value set and the second parameter value set for each of the parameters. Step (iv) further includes generating a series of rendered images by rendering the raw image based on the series of parameter value sets. Step (iv) further includes calculating a series of image quality score sets for the series of rendered images, and determining the best image quality score set from the first image quality score set, the second image quality score set, and the series of image quality score sets. Step (iv) further includes selecting a fourth parameter value set that was used to generate the rendered image having the best image quality score set, from the first parameter value set, the second parameter value set, and the series of parameter value sets. Step (iv) further includes, for each of the parameters, setting the third parameter value equal to the fourth parameter value.

In an embodiment, step (iv) further includes generating a series of parameter value sets based on the first parameter value set and the second parameter value set. The series of parameter value sets includes possible combinations of selecting one parameter value from each of the first parameter value set and the second parameter value set for each of the parameters. Step (iv) further includes generating a series of rendered images by rendering the raw image based on the series of parameter value sets. Step (iv) further includes calculating a series of image quality score sets for the series of rendered images, and determining the best image quality score set from the first image quality score set, the second image quality score set, and the series of image quality score sets. Step (iv) further includes selecting a fourth parameter value set that was used to generate the rendered image having the best image quality score set in the series of image quality score sets, from the first image quality score set, the second image quality score set, and the series of parameter value sets. Step (iv) further includes, for each of the parameters, setting the third parameter value equal to the fourth parameter value if the fourth parameter value of the parameter belongs to a majority of the fourth parameter values in the fourth parameter value set that derives from the first parameter value set or the second parameter value set, and setting the third parameter value equal to an estimated value if the fourth parameter value of the parameter does not belong to the majority in the fourth parameter value set. In a further embodiment, step (iv) further includes calculating the estimated value by using an optimization algorithm to interpolate or extrapolate the first parameter value and the second parameter value based on the first image quality score and the second image quality score.

In an embodiment, step (iv) further includes, for each of the parameters, using a deep learning network to determine whether to set the third parameter value equal to the first parameter value or the second parameter value, or to set the third parameter value equal to an estimated value, based on the first parameter value set, the second parameter value set, the first image quality score set and the second image quality score set. In a further embodiment, step (iv) further includes calculating the estimated value by using an optimization algorithm to interpolate or extrapolate the first parameter value and the second parameter value based on the first image quality score and the second image quality score.

In an embodiment, the image quality indexes includes one or more of noise, texture, tone, contrast, dynamic range, color, brightness, artifact, and temporal quality.

In an embodiment, the method further includes generating a third rendered image by rendering the raw image based on the third parameter value set. The method further includes calculating a third image quality score set for the third rendered image. The method further includes calculating a first overall score for the first rendered image, a second overall score for the second rendered image, and a third overall score for the third rendered image, based on the first image quality score set, the second image quality score set, and the third image quality score set, respectively. The method further includes determining whether to iterate steps (ii)-(iv) based on the first overall score, the second overall score, and the third overall score.

In an embodiment, the method further includes rendering another raw image based on the third parameter value set.

In an embodiment, the method further includes obtaining an ISO value for the raw image, and generating the first parameter value set and the second parameter value set based on the obtained ISO value. In a further embodiment, the step of generating the first parameter value set and the second parameter value set based on the obtained ISO value includes determining a first Anchor ISO value and a second Anchor ISO value based on the obtained ISO value, generating the first parameter value set by interpolating or extrapolating each parameter value of the first-first Anchor parameter value set and the first-second Anchor parameter value set based on the obtained ISO value, and generating the second parameter value set by interpolating or extrapolating each parameter value of the second-first Anchor parameter value set and the second-second Anchor parameter value set based on the obtained ISO value.

In an embodiment, the method further includes obtaining another ISO value for another raw image, and calculating another first parameter value set and another second parameter value set based on the obtained another ISO value. Step (ii) further includes generating another first rendered image by rendering said another raw image based on said another first parameter value set, and generating another second rendered image by rendering said another raw image based on said another second parameter value set. Step (iii) further includes calculating another first image quality score set for said another first rendered image, and calculating another second image quality score set for said another second rendered image. Step (iv) further includes generating the third parameter value set based on the first parameter value set, the second parameter value set, the first image quality score set, the second image quality score set, said another first parameter value set, said another second parameter value set, said another first image quality score set, and said another second image quality score set.

Another embodiment of the present disclosure provides a method of tuning parameters for image signal processing. The method is for use in a camera system. The method includes step (i) of capturing at least one raw image. The method further includes step (ii) of obtaining an ISO value for the raw image. The method further includes step (iii) of generating a first parameter value set by interpolating or extrapolating each parameter value of a first-first Anchor parameter value set and a first-second Anchor parameter value set based on the obtained ISO value, and generating a second parameter value set by interpolating or extrapolating each parameter value of a second-first Anchor parameter value set and a second-second Anchor parameter value set based on the obtained ISO value. The first-first Anchor parameter value set and a second-first Anchor parameter value set correspond to a first Anchor ISO value. The first-second Anchor parameter value set and the second-second Anchor parameter value set correspond to a second Anchor ISO value. The method further includes step (iv) of generating a first rendered image by rendering the raw image based on the first parameter value set, and generating a second rendered image by rendering the raw image based on the second parameter value set. The method further includes step (v) of calculating a first image quality score set for the first rendered image, and calculating a second image quality score set for the second rendered image. The method further includes step (vi) of generating a third-first Anchor parameter value set by interpolating or extrapolating each parameter value of the first-first Anchor parameter value set and the second-first Anchor parameter value set based on the first image quality score set and the second image quality score set, and generating a third-second Anchor parameter value set by interpolating or extrapolating each parameter value of the first-second Anchor parameter value set and the second-second Anchor parameter value set based on the first image quality score set and the second image quality score set. The third-first Anchor parameter value set corresponds to the first Anchor ISO value, and the third-second Anchor parameter value set corresponds to the second Anchor ISO value. In a further embodiment, step (ii) further includes obtaining another ISO value for another raw image. Step (iii) further includes generating another first parameter value set by interpolating or extrapolating each parameter value of the first-first Anchor parameter value set and the first-second Anchor parameter value set based on said another obtained ISO value, and generating another second parameter value set by interpolating or extrapolating each parameter value of the second-first Anchor parameter value set and the second-second Anchor parameter value set based on said another obtained ISO value. Step (iv) further includes generating another first rendered image by rendering said another raw image based on said another first parameter value set, and generating another second rendered image by rendering said another raw image based on said another second parameter value set. Step (v) further includes calculating another first image quality score set for said another first rendered image, and calculating another second image quality score set for said another second rendered image. Step (vi) further includes generating the third-first Anchor parameter value set by interpolating or extrapolating each parameter value of the first-first Anchor parameter value set and the second-first Anchor parameter value set based on the first image quality score set, the second image quality score set, said another first image quality score set, and said another second image quality score set, and generating the third-second Anchor parameter value set by interpolating or extrapolating each parameter value of the first-second Anchor parameter value set and the second-second Anchor parameter value set based on the first image quality score set, the second image quality score set, said another first image quality score set, and said another second image quality score set.

An embodiment of the present disclosure provides a camera system. The camera system includes an image sensor and an image processing device. The image sensor is configured to execute step (i) of the method as described. The image processing device is connected to the image sensor, and is configured to receive the raw image from the image sensor and execute other steps of the method as described.

An objective of the present disclosure is to provide schemes, concepts, designs, techniques, methods and apparatus pertaining to tuning parameters for image signal processing. By implementing the techniques described in the present disclosure, benefits of more balanced and visually appealing images across a variety of different scenes and lighting conditions can be achieved.

BRIEF DESCRIPTION OF THE DRAWINGS

The present disclosure can be better understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

FIG. 1A is the flow diagram of a method of tuning parameters for image signal processing, according to an embodiment of the present disclosure;

FIG. 4 is the flow diagram of the third implementation of the step of generating the tuned parameter value set, according to an embodiment of the present disclosure;

FIG. 7 is the flow diagram of the sixth implementation of the step of generating the tuned parameter value set, according to an embodiment of the present disclosure;

FIG. 9 is the flow diagram of steps for determining whether the iteration is proceeded or halted, according to an embodiment of the present disclosure;

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

Figure 1B:
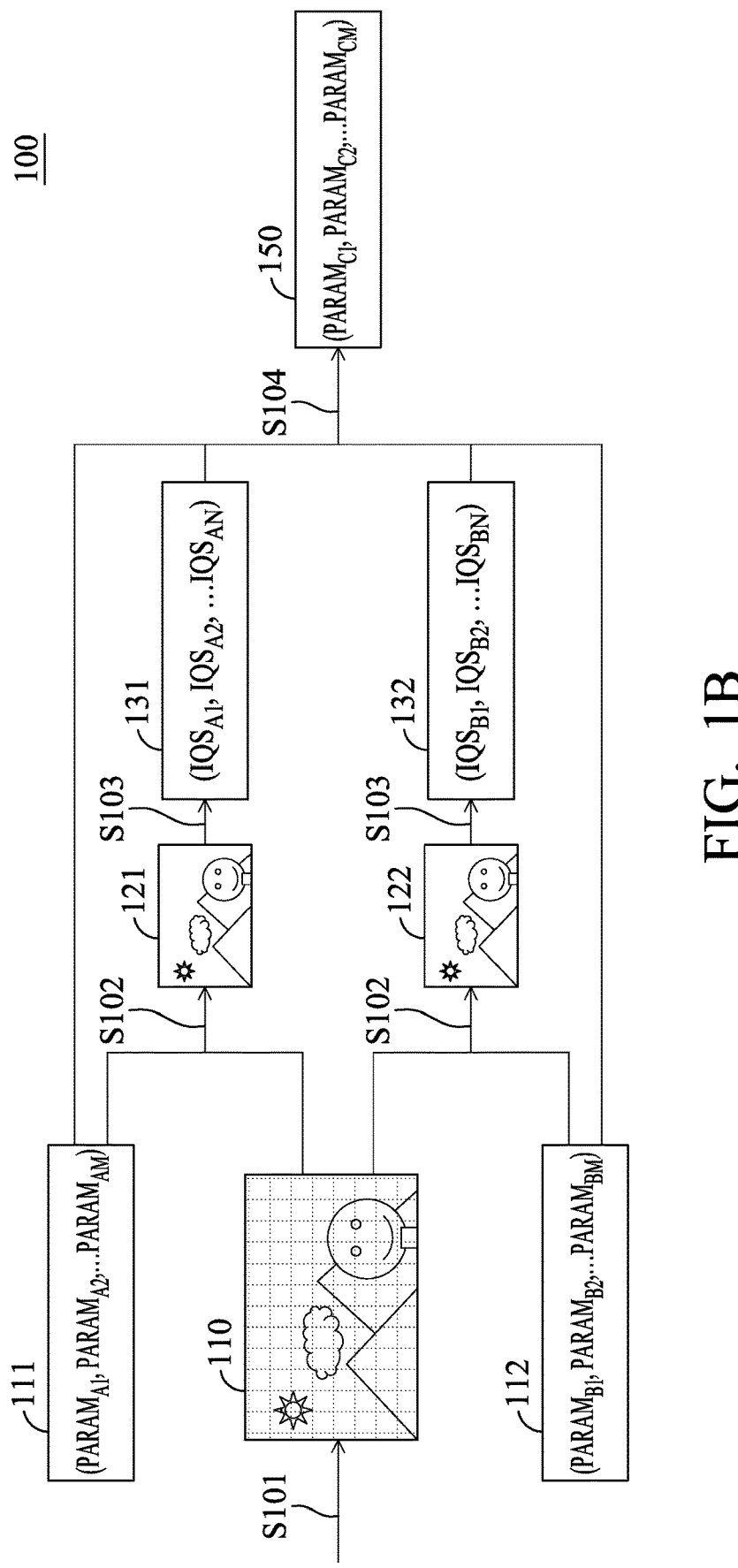
FIG. 1B is the schematic diagram of the method of tuning parameters for image signal processing, according to an embodiment of the present disclosure.

FIG. 1A is the flow diagram of a method 100 of tuning parameters for image signal processing, according to an embodiment of the present disclosure. As shown in FIG. 1A, the method 100 includes steps S101-S104. Correspondingly, FIG. 1B is the schematic diagram of the method 100. Please read the following descriptions with reference to FIG. 1A and FIG. 1B together for better understanding of the embodiment of the present disclosure.

In step S101, at least one raw image 110 is captured. Then, the method 100 proceeds to step S102.

In step S102, a first rendered image 121 is generated by rendering the raw image 110 based on a first parameter value set 111, and a second rendered image 122 is generated by rendering the raw image 110 based on a second parameter value set 112. Then, the method 100 proceeds to step S103.

As shown in FIG. 1B, the first parameter value set 111 includes first parameter values $PARAM_{A1}$, $PARAM_{A2}$, . . . , $PARAM_{AM}$ of M parameters, where M is a positive integer larger than one. Likewise, the second parameter value set 112 includes second parameter values $PARAM_{B1}$, $PARAM_{B2}$, . . . , $PARAM_{BM}$ of the M parameters. These parameters may be used by various image processing algorithms, such as demosaicing, noise reduction (denoising), edge enhancement, etc. Each algorithm may utilize one or more of the M parameters, with each parameter potentially being used by one or more algorithms. In an embodiment, the first parameter value set 111 and the second parameter value set 112 can be represented in the form of a vector (as shown in FIG. 1B) or an array, but the present disclosure is not limited thereto.

In step S103, a first image quality score set 131 for the first rendered image 121, and a second image quality score set 132 for the second rendered image 122, are calculated. Then, the method 100 proceeds to step S104.

As shown in FIG. 1B, the first image quality score set 131 includes the first image quality scores $IQS_{A1}$, $IQS_{A2}$, . . . , $IQS_{AN}$ of N image quality indexes, wherein N is a positive integer larger than one. In some cases, N can be equal to one. Likewise, the second image quality score set 132 includes the second image quality scores $IQS_{B1}$, $IQS_{B2}$, . . . , $IQS_{BN}$ of the N image quality indexes. In an embodiment, the first image quality score set 131 and the second image quality score set 132 can be represented in the form of a vector (as shown in FIG. 1B) or an array, but the present disclosure is not limited thereto.

In an embodiment, any of the first image quality scores $IQS_{A1}$, $IQS_{A2}$, . . . , $IQS_{AN}$ and the second image quality scores $IQS_{B1}$, $IQS_{B2}$, . . . , $IQS_{BN}$ can be evaluated through Image Quality Assessment (IQA), including subjective and objective IQA. The subjective IQA is to evaluate the image quality from the subjective perception of people and is typically expressed by the Mean Opinion Score (MOS) or the Differential Mean Opinion Score (DMOS). The objective IQA includes Full Reference Image Quality Assessment (FR-IQA), Reduced Reference Image Quality Assessment (RR-IQA), and No Reference Image Quality Assessment (NR-IQA). FR-IQA refers to comparing the test image with a reference image having ideal quality to analyze the degree of distortion of the test image. RR-IQA refers to comparing the partial feature information of the test image with the reference image having ideal quality to obtain the quality assessment result of the test image. NR-IQA refers to the direct evaluation of the quality of a test image based on statistical properties (e.g., mean, standard deviation, entropy, etc.) of pixels without a reference image. Various aspects of the IQA as described for evaluating the image quality scores are not limited by the present disclosure.

In an embodiment, the image quality indexes involves factors such as noise, texture, tone, contrast, dynamic range, color, brightness, artifact, and temporal quality, but the present disclosure is not limited thereto.

In step S104, a third parameter value set 150 is generated based on the first parameter value set 111, the second parameter value set 112, the first image quality score set 131, and the second image quality score set 132. In some implementations of step S104, based on the first image quality score set 131 and the second image quality score set 132, it is determined, for each of the M parameters, whether to set the third parameter value $PARAM_{Ci}$ equal to the first parameter value $PARAM_{Ai}$ or the second parameter value $PARAM_{Bi}$. In some other implementations, an estimated value for the third parameter value $PARAM_{Ci}$ may be determined based on the first parameter value $PARAM_{Ai}$ and the second parameter value $PARAM_{Bi}$, and the third parameter value $PARAM_{Ci}$ may be set equal to the estimated value. In further implementations, the estimated value can be calculated through interpolation and extrapolation, thereby serving as a compromise parameter value for multiple image quality indexes.

In an embodiment, method 100 further includes rendering another raw image based on the third parameter value set 150 generated in step S103. In an implementation of this embodiment, the raw image and the "another raw image" can refer to two different frames in a video sequence, but the present disclosure is not limited thereto.

Figure 2:
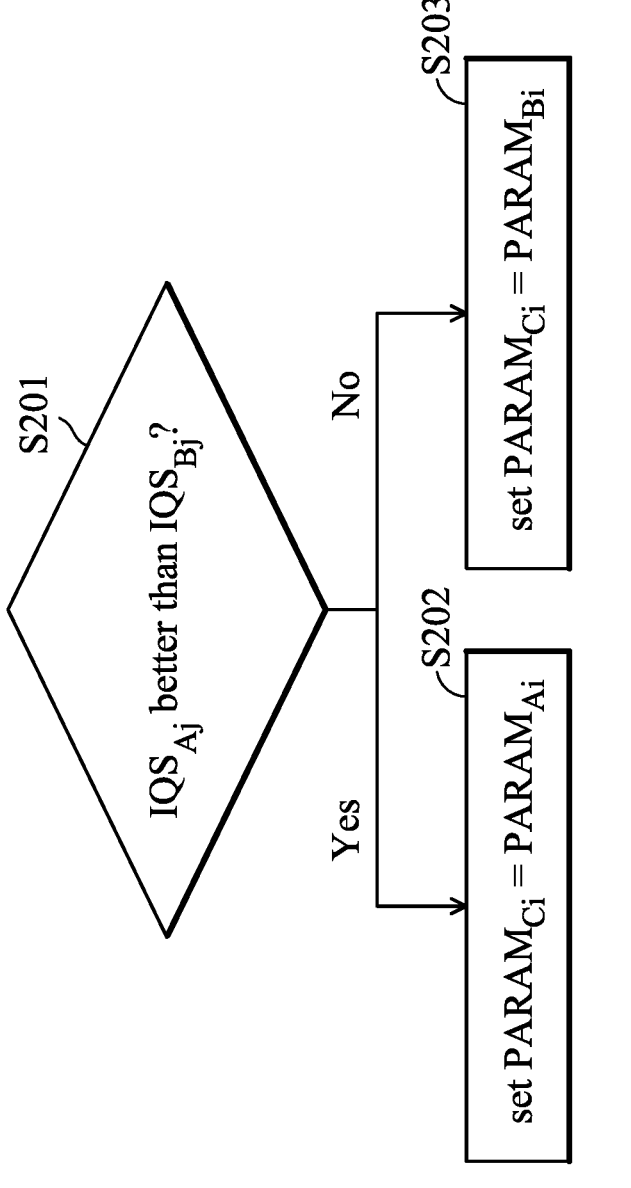
FIG. 2 is the flow diagram of the first implementation of the step of generating the tuned parameter value set, according to an embodiment of the present disclosure.

FIG. 2 is the flow diagram of the first implementation of step S104, according to an embodiment of the present disclosure. As shown in FIG. 2, step S104 may further includes steps S201-S203. In this implementation, each of the M parameters is mapped to only one of the N image quality indexes. In other words, each parameter may only affect the image quality score of one image quality index. In FIG. 2 and in the following description, it is assumed that the ith parameter is mapped to the jth image quality index among the N indexes, and the steps S201-S203 depicted in FIG. 2 are executed for i ranging from 1 to M.

In step S201, the first image quality score $IQS_{Aj}$ and the second image quality score $IQS_{Bj}$ of the jth image quality index are compared. If $IQS_{Aj}$ is better than $IQS_{Bj}$, the method proceeds to step S202. Otherwise, the method proceeds to step S203.

In step S202, the third parameter value $PARAM_{Ci}$ is set equal to the first parameter value $PARAM_{Ai}$.

In step S203, the third parameter value $PARAM_{Ci}$ is set equal to the second parameter value $PARAM_{Bi}$.

It should be noted that the "better" image quality score does not necessarily mean the image quality score is higher or lower. In some cases, the "better" image quality score means the image quality score is closer to a certain number. For instance, supposed the certain number is 0, a lower image quality score −10 is better than a lower image quality score 20, because −10 is closer to the certain number 0 than 20. In an embodiment, the certain number can be predefined or determined through various aspects of the IQA as described above, which is not reiterated here. In an embodiment, the certain number is set to zero, making step S201 a process of comparing the absolute values of the first image quality score $IQS_{Aj}$ and the second image quality score $IQS_{Bj}$ to determine which one is smaller (the smaller, the better).

Figure 3:
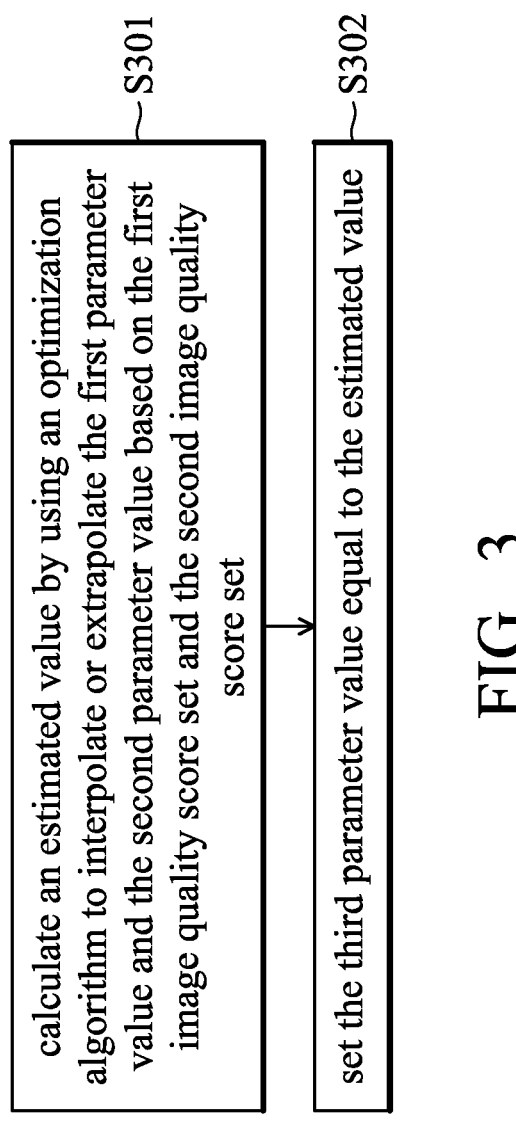
FIG. 3 is the flow diagram of the second implementation of the step of generating the tuned parameter value set, according to an embodiment of the present disclosure.

FIG. 3 is the flow diagram of the second implementation of step S104, according to an embodiment of the present disclosure. As shown in FIG. 3, step S104 may further includes steps S301-S302. In this implementation, each parameter is mapped to one or more of the image quality indexes. The mapping relationship may indicate which parameters each image quality index depends on, and/or which image quality indexes each parameter affects. Additionally, the steps depicted in FIG. 3 are executed for each of the M parameters.

In step S301, an estimated value is calculated by using an optimization algorithm to interpolate or extrapolate the first parameter value $PARAM_{Ai}$ and the second parameter value $PARAM_{Bi}$ based on the first image quality score set 131 and the second image quality score set 132. Then, the method proceeds to step S302.

In step S302, the third parameter value $PARAM_{Ci}$ is set equal to the estimated value.

The optimization algorithm employed in step S301 can be one of several commonly used optimization algorithms, such as Broyden-Fletcher-Goldfarb-Shanno (BFGS), Limited-memory BFGS (L-BFGS or LM-BFGS), L-BFGS-B, and Sequential quadratic programming (SQP), but the present disclosure is not limited thereto. The primary goal of the optimization algorithm is to find the optimum weight values for the first parameter value $PARAM_{Ai}$ and the second parameter value $PARAM_{Bi}$ when calculating their interpolation or extrapolation, such that the estimated value (i.e., the interpolation or extrapolation) will result in the best possible image quality score. To achieve this goal, the optimization algorithm uses a cost function to evaluate the quality of the image output generated by the image processing algorithm for a particular set of weight values. It is worth to note that this "quality of the image output generated by the image processing algorithm for a given set of weight values" need not be obtained by actually producing images using the particular set of weight values and calculating their quality scores. In some implementations, the quality of the image output generated by the image processing algorithm for a particular set of weight values can be initially evaluated based on the assumption that there is a linear relationship between the image quality score and the weight value set, and then checked by generating the image to see if its image quality score has reached or approached the optimal value. The cost function can be defined or determined based on various distance metrics, such as Manhattan distance, Euclidean distance, Minkowski distance, etc., the present disclosure is not limited thereto. Furthermore, the optimization algorithm involves gradient descent, that is, iteratively adjusting the weight values by computing the gradient of the cost function with respect to the weights and updating the weights in the direction of steepest descent. By iteratively adjusting the weight values and evaluating the resulting image quality scores using the optimization algorithm, the optimal weight values for the first parameter value $PARAM_{Ai}$ and the second parameter value $PARAM_{Bi}$ will be converged.

FIG. 4 the flow diagram of the third implementation of step S104, according to an embodiment of the present disclosure. As shown in FIG. 4, step S104 may further includes steps S401-S404. In this implementation, each parameter is mapped to one or more of the image quality indexes. The mapping relationship may indicate which parameters each image quality index depends on, and/or which image quality indexes each parameter affects. Additionally, the steps depicted in FIG. 4 are executed for each of the M parameters.

In step S401, the first aggregated score is calculated based on one or more of the first image quality scores of the image quality indexes mapped to the parameter, and the second aggregated score is calculated based on one or more of the second image quality scores of the image quality indexes mapped to the parameter. For example, if the ith parameter is mapped to the jth and kth image quality indexes among the N indexes, the first aggregated score is calculated based on the first image quality scores $IQS_{Aj}$ and $IQS_{Ak}$, and the second aggregated score is calculated based the second image quality scores $IQS_{Bj}$ and $IQS_{Bk}$. Then, the method proceeds to step S402.

In step S402, the first aggregated score and the second aggregated score are compared. If the first aggregated score is better than the second aggregated score, the method proceeds to step S403. Otherwise, the method proceeds to step S404.

In step S403, the third parameter value $PARAM_{Ci}$ is set equal to the first parameter value $PARAM_{Ai}$.

In step S404, the third parameter value $PARAM_{Ci}$ is set equal to the second parameter value $PARAM_{Bi}$.

In an embodiment, the first aggregated score and the second aggregated score can be calculated using various distance metrics, such as Manhattan distance, Euclidean distance, Minkowski distance, etc., but the present disclosure is not limited thereto.

It should be noted that the "better" aggregated score does not necessarily indicate a higher or lower value. However, in the embodiment where the first aggregated score and the second aggregated score are calculated using a distance metric, a lower value typically indicates a better aggregated score.

Figure 5:
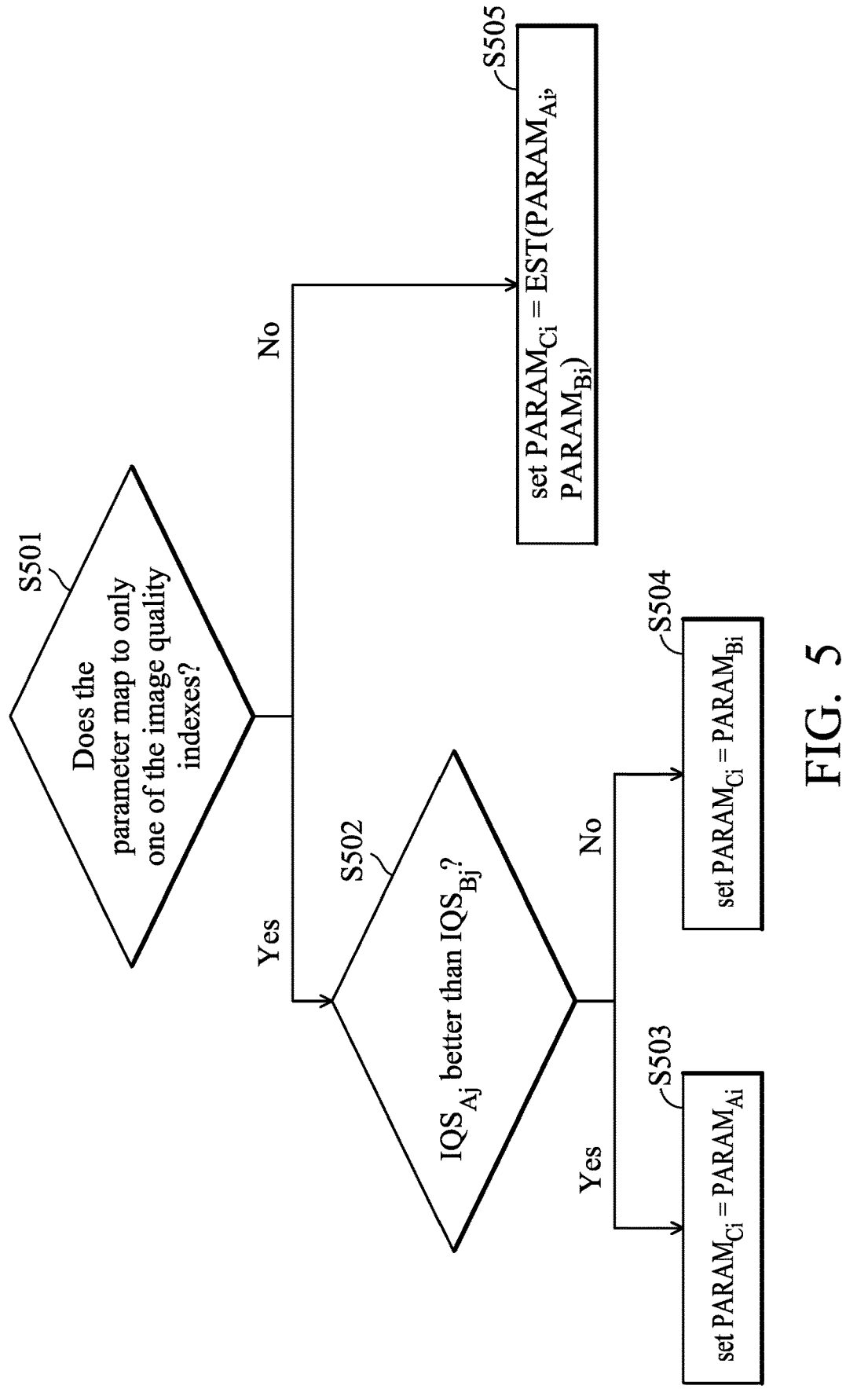
FIG. 5 is the flow diagram of the fourth implementation of the step of generating the tuned parameter value set, according to an embodiment of the present disclosure.

FIG. 5 is the flow diagram of the fourth implementation of step S104, according to an embodiment of the present disclosure. As shown in FIG. 5, step S104 may further includes steps S501-S505. In this implementation, each parameter is mapped to one or more of the image quality indexes. The mapping relationship may indicate which parameters each image quality index depends on, and/or which image quality indexes each parameter affects. Additionally, the steps depicted in FIG. 5 are executed for each of the M parameters.

In step S501, a mapping table is checked to determine whether the parameter is mapped to only one of the N image quality indexes. If the parameter is mapped to only one of the N image quality indexes, the method proceeds to step S502. Otherwise, the method proceeds to step S505.

The mapping table records how the image quality indexes are mapped to the parameters. Therefore, the mapping table can indicate which parameters each image quality indexes depends on, and/or which image quality indexes each parameter affects.

In step S502, the first image quality score $IQS_{Aj}$ and the second image quality score $IQS_{Bj}$ of said image quality index are compared. If the first image quality score $IQS_{Aj}$ is better than the second image quality score $IQS_{Bj}$, the method proceeds to step S503. Otherwise, the method proceeds to step S504.

In step S503, the third parameter value $PARAM_{Ci}$ is set equal to the first parameter value $PARAM_{Ai}$.

In step S504, the third parameter value $PARAM_{Ci}$ is set equal to the second parameter value $PARAM_{Bi}$.

In step S505, the estimated value, EST ($PARA_{Ai}$, $PARAM_{Bi}$), is calculated by using an optimization algorithm to interpolate or extrapolate the first parameter value $PARAM_{Ai}$ and the second parameter value $PARAM_{Bi}$ based on the first image quality score set 131 and the second image quality score set 132, and the third parameter value $PARAM_{Ci}$ is set equal to the estimated value.

The optimization algorithm employed in step S505 has been discussed in detail in the previous description of FIG. 3 and will not be reiterated here.

In an embodiment, step S104 includes a further check to determine if all the first image quality scores $IQS_{A1}$, $IQS_{A2}$, . . . , $IQS_{AN}$ are better than the second image quality scores $IQS_{B1}$, $IQS_{B2}$, . . . , $IQS_{BN}$ (i.e., $IQS_{A1}$ is better than $IQS_{B1}$. $IQS_{A2}$ is better than $IQS_{B2}$, and so on). If this is the case, indicating that the first parameter value set 111 performs better than the second parameter value set 112 in all aspects when rendering the raw image 110, then the third parameter value set 150 is set equal to the first parameter value set 111. Conversely, if all the second image quality scores $IQS_{B1}$, $IQS_{B2}$, . . . , $IQS_{BN}$ are better than the first image quality scores $IQS_{A1}$, $IQS_{A2}$, . . . , $IQS_{AN}$, meaning that the second parameter value set 112 performs better than the first parameter value set 111 in all aspects when rendering the raw image 110, then the third parameter value set 150 is set equal to the second parameter value set 112. If some of the first image quality scores are better than the second image quality scores, but not all, step S104 proceeds to determine whether to set the third parameter value equal to the first or second parameter value for each parameter, or to calculate an estimated value based on the first and second parameter values and set the third parameter value to the estimated value.

Figure 6A:
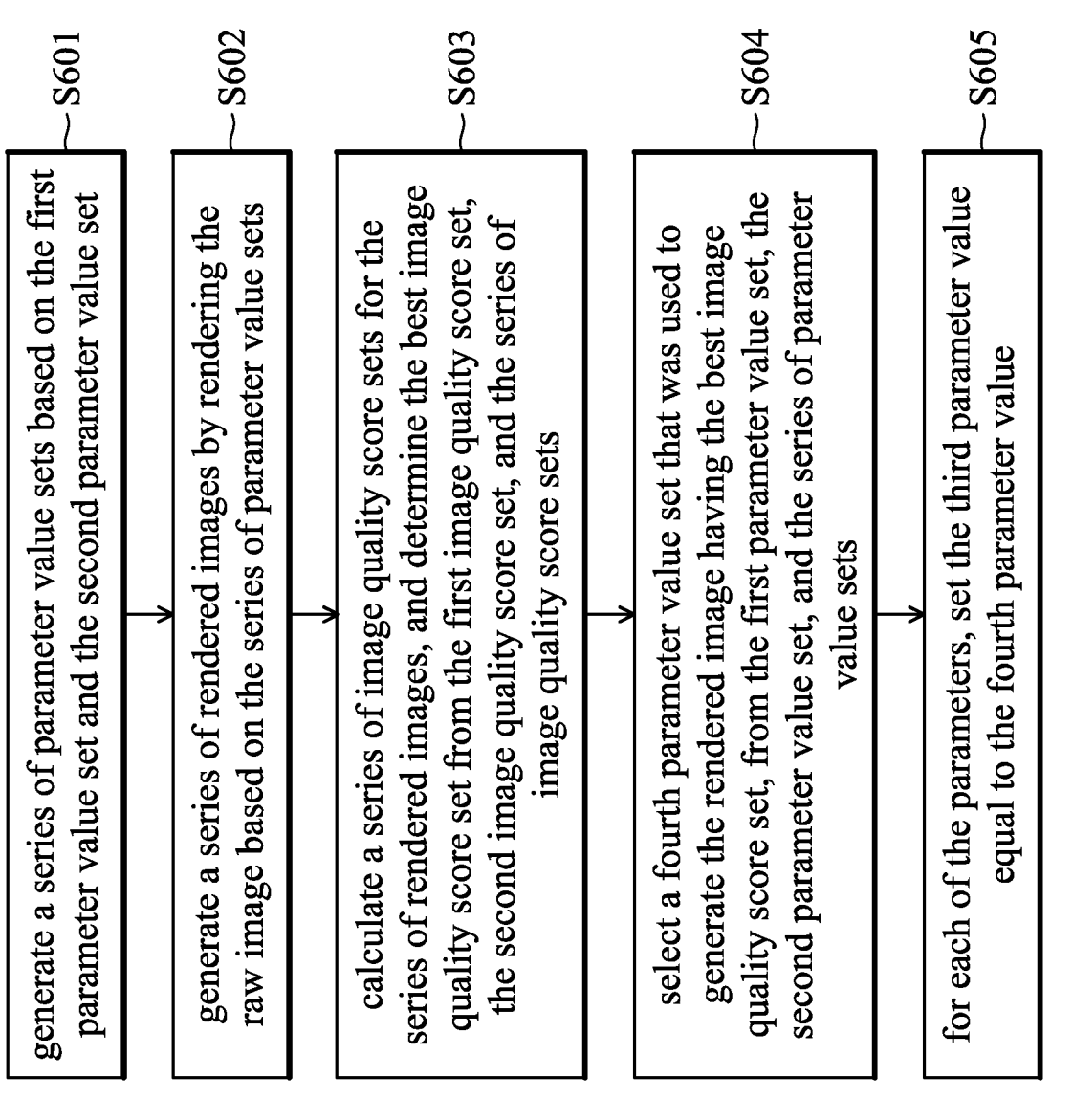
FIG. 6A is the flow diagram of the fifth implementation of the step of generating the tuned parameter value set, according to an embodiment of the present disclosure.
Figure 6B:
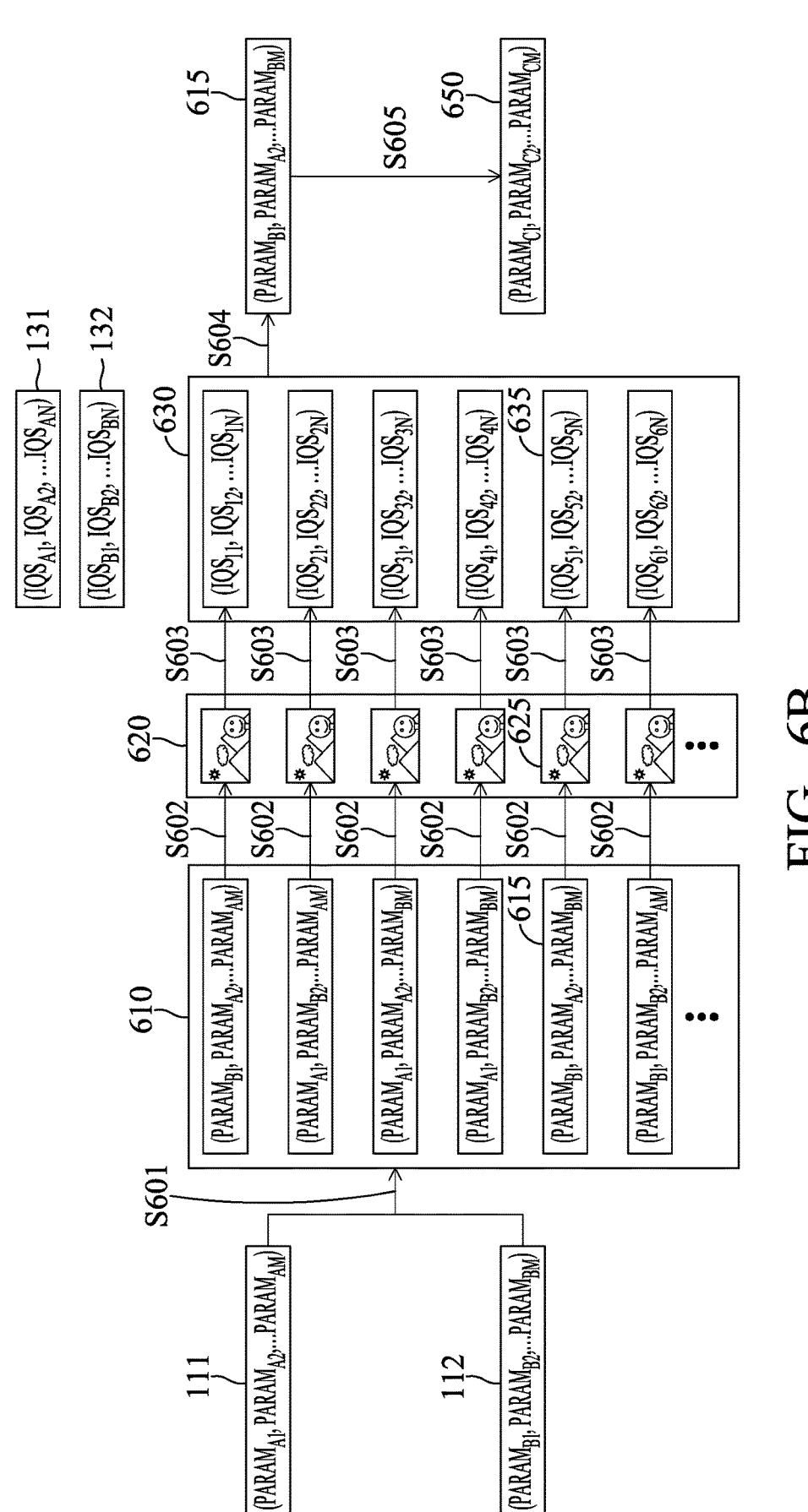
FIG. 6B is the schematic diagram of the fifth implementation of the step of generating the tuned parameter value set, according to an embodiment of the present disclosure.

FIG. 6A is the flow diagram of the fifth implementation of step S104, according to an embodiment of the present disclosure. As shown in FIG. 6A, step S104 may further includes step S601-S605. Correspondingly, FIG. 6B is the schematic diagram of the fifth implementation of step S104. Please read the following descriptions with reference to FIG. 6A and FIG. 6B together for better understanding of the fifth implementation of step S104.

In step S601, a series 610 of parameter value sets are generated based on the first parameter value set 111 and the second parameter value set 112. The series of the generated parameter value sets includes possible combinations of selecting one parameter value from each of the first parameter values $PARAM_{A1}$, $PARAM_{A2}$, . . . , $PARAM_{AM}$ and the second parameter values $PARAM_{B1}$, $PARAM_{B2}$, . . . , $PARAM_{BM}$ of M parameters. In other words, each of the parameter values of each of the parameter value sets in the series 610 of parameter value sets derives from either the first parameter value set 111 or the second parameter value set 112. Then, the method proceeds to step S602.

In step S602, a series 620 of rendered images are generated by rendering the raw image 110 based on the series 610 of parameter value sets. Then, the method proceeds to step S603.

In step S603, a series 630 of image quality score sets are calculated for the series 620 of rendered images, and the best image quality score set is determined from the first parameter value set 131, the second parameter value set 132, and the series 630 of image quality score sets. In this example, it is assumed that the image quality score set 635 is determined to be the best image quality score set in the series 630. Then, the method proceeds to step S604.

In an embodiment, the best image quality score set is determined based on the aggregated score for each image quality score set in the series 630. The aggregated scores can be calculated using various distance metrics, such as Manhattan distance, Euclidean distance, Minkowski distance, etc., but the present disclosure is not limited thereto.

In step S604, a fourth parameter value set 615 is selected from the series 610 of parameter value sets. The selected fourth parameter value set 615 is the parameter value set in the series 610 that was used to generate the rendered image 625 having the best image quality score set 635 in the series 630 of image quality score sets. Then, the method proceeds to step S605.

In step S605, for each of the patameters, the third parameter value $PARAM_{Ci}$ of the third parameter value set 150 is set equal to the fourth parameter value. In this example, the third parameter value $PARAM_{C1}$ is set equal to the fourth parameter value $PARAM_{B1}$ in the fourth parameter value set 615, the third parameter value $PARAM_{C2}$ is set equal to the fourth parameter value $PARAM_{A2}$ in the fourth parameter value set 615, and the third parameter value $PARAM_{CM}$ is set equal to the fourth parameter value $PARAM_{BM}$ in the fourth parameter value set 615, etc.

FIG. 7 is the flow diagram of the sixth implementation of step S104, according to an embodiment of the present disclosure. As shown in FIG. 7, step S104 may further include steps S601-S604 and S705. The difference between FIG. 7 and FIG. 6A is that the step S605 in FIG. 6A is replaced by S705 in FIG. 7. Except for this difference, steps S601-S604 are the same in the both figures, and the description for these steps will not be reiterated here.

In step S705, the third parameter value $PARAM_{Ci}$ is set equal to the fourth parameter value if the fourth parameter value of the parameter belongs to the majority of the fourth parameter values in the fourth parameter value set 615 that derives from the first parameter value set 111 or the second parameter value set 112, and the third parameter value $PARAM_{Ci}$ is set equal to the estimated value if the fourth parameter value of the parameter does not belong to the majority in the fourth parameter value set 615. The estimated value can be calculated by using an optimization algorithm to interpolate or extrapolate the first parameter value and the second parameter value based on the first image quality score and the second image quality score. In this example, it is assumed that the majority of the fourth parameter values in the fourth parameter value set derives from the second parameter value set 112. For i=1, the third parameter value $PARAM_{C1}$ is set equal to the fourth parameter value $PARAM_{B1}$ because the fourth parameter value $PARAM_{B1}$ belongs to the majority that derives from the second parameter value set 112. For i=2, the third parameter value $PARAM_{C2}$ is set equal to the estimated value because the fourth parameter value $PARAM_{A2}$ does not belong to the majority in the fourth parameter value set 615.

Figure 8:
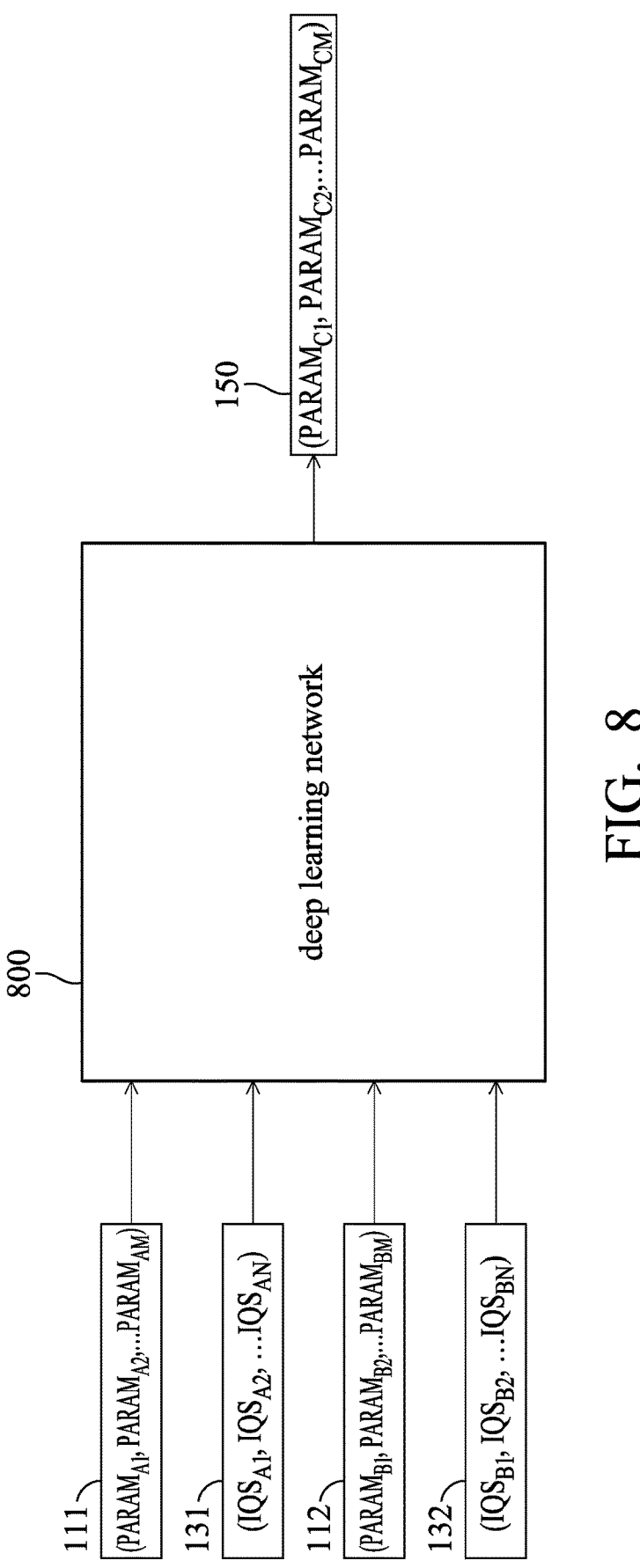
FIG. 8 is the schematic diagram of the seventh implementation of the step of generating the tuned parameter value set, according to an embodiment of the present disclosure.

FIG. 8 is the schematic diagram of the seventh implementation of step S104, according to an embodiment of the present disclosure. As shown in FIG. 8, a deep learning network 800 is used to generate the third parameter value set 150 based on the first parameter value set 111, the second parameter value set 112, the first image quality score set 131, and the second image quality score set 132. More specifically, for each of the M parameters, the deep learning network 800 is used to determine whether to set the third parameter value $PARAM_{Ci}$ equal to the first parameter value $PARAM_{Ai}$ or the second parameter value $PARAM_{Bi}$, or to set the third parameter value $PARAM_{Ci}$ equal to the estimated value. In an embodiment, the estimated value can be calculated by using an optimization algorithm to interpolate or extrapolate the first parameter value and the second parameter value based on the first image quality score and the second image quality score. In another embodiment, the estimated value can also be determined by using the deep learning network 800.

In an embodiment, the deep learning network 800 has been trained using a dataset that contains multiple pairs of image quality score sets and corresponding set of parameters values. By training the deep learning network 800 using a large training dataset with a variety of image quality score sets and parameters value sets, the network can learn the relationship between the image quality score sets and the corresponding set of parameter values, and can use this knowledge to determine the optimal set of parameters values for any given set of image quality scores. During training, the deep learning network 800 adjusts its weights and biases to minimize the difference between the predicted output of the network and the actual output for each pair in the training dataset. The training process involves gradient descent, that is, iteratively adjusting the weight values by computing the gradient of the loss function with respect to the weights and updating the weights in the direction of steepest descent. The gradient of the loss function is computed using a technique called backpropagation, which involves propagating the error from the output layer of the network back through the network to adjust the weights and biases of the preceding layers.

FIG. 9 is the flow diagram of steps S901-S904 for determining whether the iteration of steps $102-S104 is proceeded or halted, according to an embodiment of the present disclosure.

In step S901, a third rendered image is generated by rendering the raw image based on the third parameter value set. Then, the method proceeds to step S902.

In step S902, a third image quality score set for the third rendered image is calculated. Then, the method proceeds to step S903.

In step S903, a first overall score for the first rendered image, a second overall score for the second rendered image, and a third overall score for the third rendered image are calculated based on the first image quality score set, the second image quality score set, and the third image quality score set, respectively. Then, the method proceeds to step S904.

In an embodiment, the first overall score, the second overall score, and the third overall score can be calculated using various distance metrics, such as Manhattan distance, Euclidean distance, Minkowski distance, etc., the present disclosure is not limited thereto.

In step S904, it is determined whether to iterate the steps S102-S104 based on the first overall score, the second overall score, and the third overall score.

In an embodiment, if the difference between the third overall score and the better of the first overall score and the second overall score is below a first threshold, it indicates that the third parameter value set is sufficiently good. Continuing further iterations with the cost of computing resources would not yield significant improvements, and therefore, the iteration is halted. On the contrary, if the difference reaches or exceeds the first threshold, it indicates that the third parameter value set has potential for improvement. Therefore, the worse of the first parameter value set and the second parameter value set will be overwritten by the third parameter value set, and subsequently, steps S102-S104 will be iterated with the use of the overwritten parameter value set.

In another embodiment, if the difference between the third parameter value set and one of the first parameter value set and the second parameter value set that corresponds to the better of the first overall score and the second overall score is below a second threshold, the iteration is halted. If the difference reaches or exceeds the second threshold, the worse of the first parameter value set and the second parameter value set will be overwritten by the third parameter value set, and the steps S102-S104 will be iterated with the use of the overwritten parameter value set. In this embodiment, the difference between two parameter value sets (i.e., the difference between the third parameter value set and the first parameter value set, or the difference between the third parameter value set and the second parameter value set) can be represented in the form of various distance metrics, such as Manhattan distance, Euclidean distance, Minkowski distance, etc., but the present disclosure is not limited thereto.

In some embodiments, the first parameter value set 111 and the second parameter value set 112 are dependent on the ISO value of the raw image 110. In photography and digital imaging, ISO refers to the sensitivity of the camera's sensor to light. The higher the ISO value, the more sensitive the sensor is to light, which allows for better performance in low light conditions. Different ISO values can impact the exposure of an image, thereby influencing its quality. Consequently, varying ISO values may necessitate distinct parameter value sets for image processing to attain the desired image quality. It should be noted that the relationship between ISO values and parameter value sets is not necessarily one-to-one. In other words, a single ISO value may correspond to multiple sets of parameter values. This arises from the fact that ISO value is not the sole determinant of image quality. As previously explained, image quality indexes may involve factors such as noise, texture, tone, contrast, dynamic range, color, brightness, artifact, and temporal quality. Under consistent lighting conditions (i.e., ISO value remains constant), different weightings assigned to these factors correspond to different parameter value sets. For instance, while the first parameter value set 111 and the second parameter value set 112 both correspond to the same ISO value, the former may prioritize noise reduction, whereas the latter may emphasize contrast.

Figure 10:
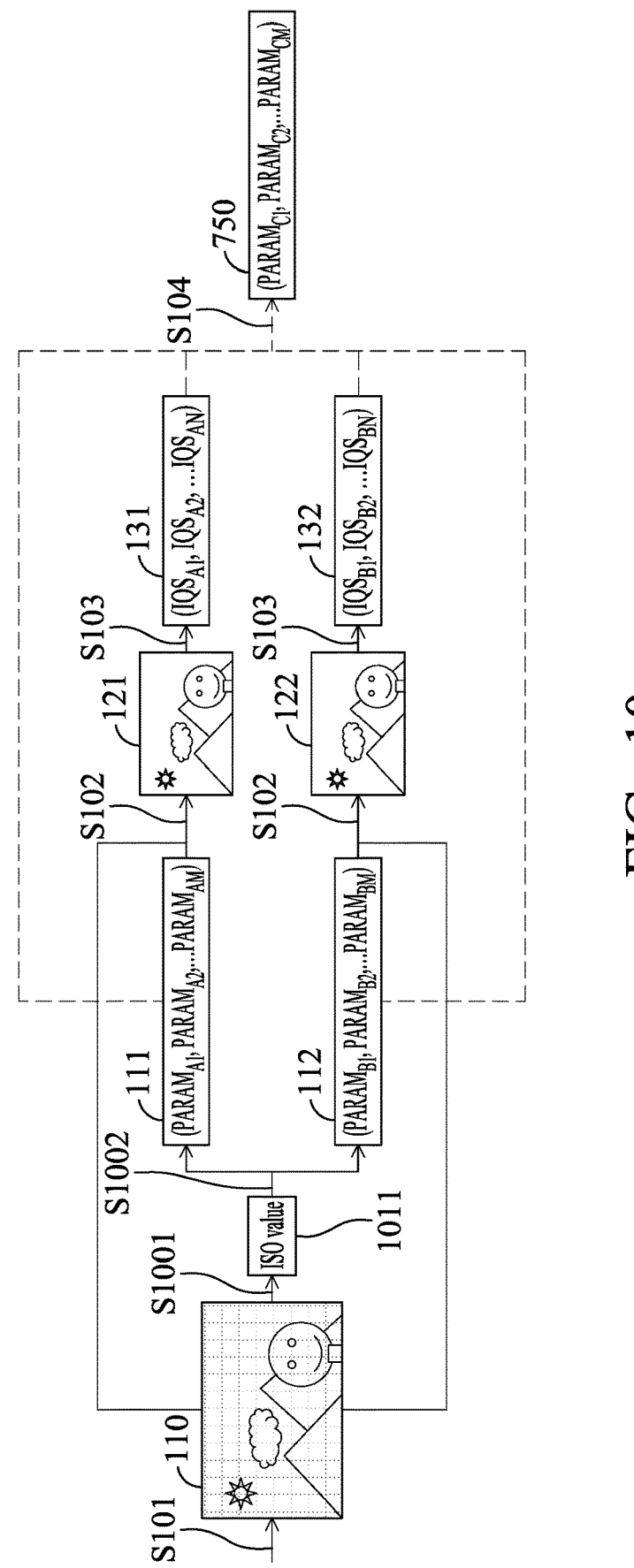
FIG. 10 is the schematic diagram of a method of tuning parameters for image signal processing, according to an embodiment of the present disclosure.

FIG. 10 is the schematic diagram of a method 1000 of tuning parameters for image signal processing, according to an embodiment of the present disclosure. As shown in FIG. 10, the method 1000 incorporates steps S1001 and S1002 in addition to the steps S101-S104 of the method 100 shown in FIG. 1. Except for this difference, steps S101-S104 of the method 1000 remain unchanged from the method 100, and the description for these steps will not be reiterated here.

In step S1001, the ISO value 1011 for the raw image 110 is obtained. In one implementation, the ISO value 1011 is predetermined and stored as metadata before or during the image capture process. It is then retrieved from memory in step S1001. In another implementation, the ISO value 1011 can be inferred in step S1001 by analyzing the features of the raw image 110.

In step S1002, the first parameter value set 111 and the second parameter value set 112 are generated based on the obtained ISO value 1011.

In an embodiment, the first parameter value set 111 and the second parameter value set 112 are generated based on parameter value sets that correspond to Anchor ISO values. The Anchor ISO is specified as a reference ISO value used to determine the optimal ISO setting. Due to limited storage resources, it is not feasible for a camera system to store parameter settings for all possible ISO values. Therefore, the parameter value set mapped to a specific ISO value, such as the ISO value 1011, can be determined by referencing the parameter value sets associated with the Anchor ISO values. Similar to the ISO values, the Anchor ISO value may also correspond to multiple sets of parameter values. Hence, the first parameter value set 111 and the second parameter value set 112 are obtained by comprehensively considering multiple (e.g., two) parameter value sets corresponding to multiple (e.g., two) Anchor ISO values. To distinguish them from other parameter value sets, the parameter value sets that correspond to an Anchor ISO value will be referred to as "Anchor parameter sets," even though they are essentially parameter value sets.

Figure 11:
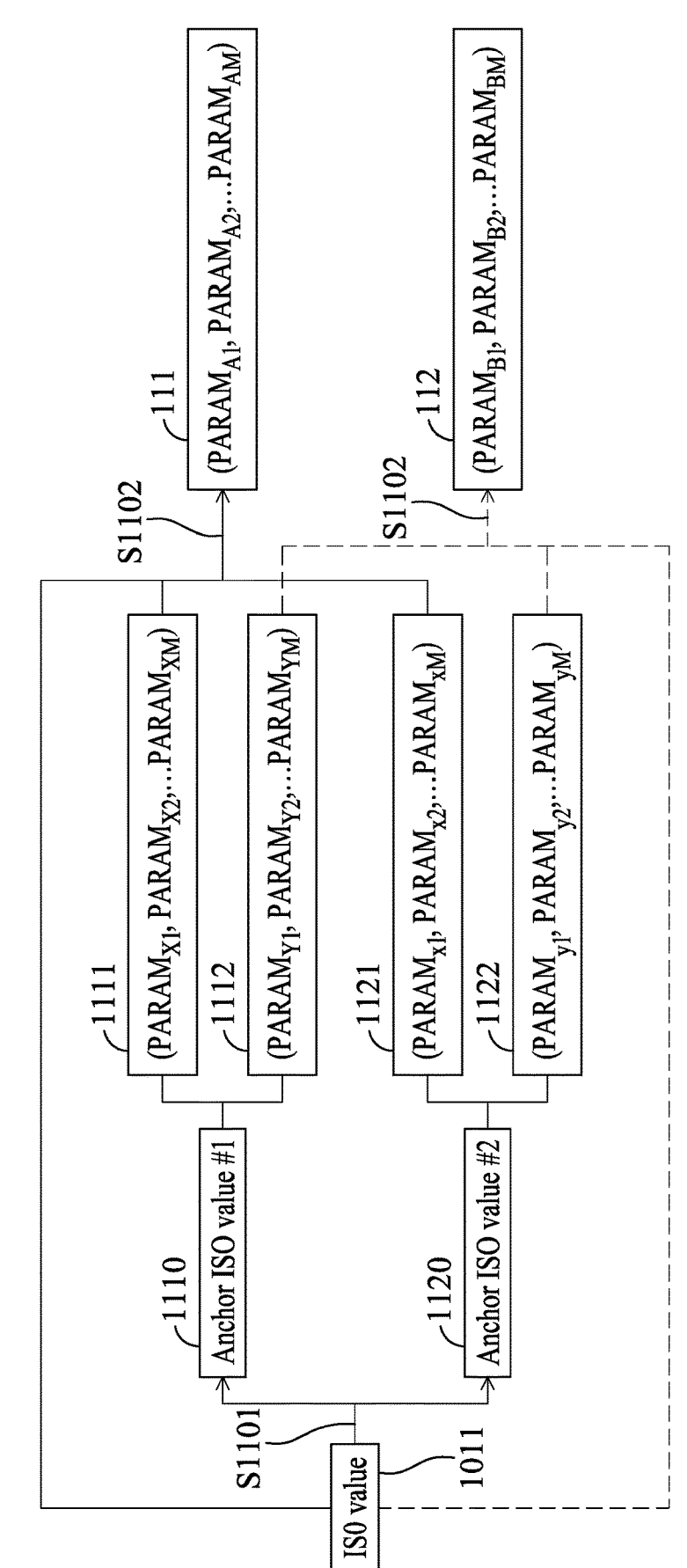
FIG. 11 is the schematic diagram of an implementation of the step of generating the first parameter value set and the second parameter value set, according to an embodiment of the present disclosure.

FIG. 11 is the schematic diagram of an implementation of step S1002, according to an embodiment of the present disclosure. As shown in FIG. 11, step S1002 may further includes step S1101 and S1102.

In step S1101, the first Anchor ISO value 1110 and the second Anchor ISO value 1120 are determined based on the ISO value, such as the ISO value 1011 obtained in step S1001 illustrated in FIG. 10. For instance, if the ISO value 1011 is 250, and the camera system only has parameter sets for Anchor ISO values of 100, 200, 400, 600, and 800, the first Anchor ISO value 1110 and the second Anchor ISO value 1120 would be 200 and 400, respectively. This is because 200 and 400 are the two closest values to 250 among the available Anchor ISO values of 100, 200, 400, 600, and 800.

As shown in FIG. 11, the first Anchor ISO value 1110 corresponds to the first-first Anchor parameter value set 1111 and the second-first Anchor parameter value set 1112, and the second Anchor ISO value 1120 corresponds to the first-second Anchor parameter value set 1121 and the second-second Anchor parameter value set 1122. Additionally, the first-first Anchor parameter value set 1111 includes first-first Anchor parameter values $PARAM_{X1}$, $PARAM_{X2}$, ..., $PARAM_{XM}$ of the M parameters. Likewise, the second-first Anchor parameter value set 1112 includes second-first Anchor parameter values $PARAM_{Y1}$, $PARAM_{Y2}$, ..., $PARAM_{YM}$, the first-second Anchor parameter value set 1121 includes first-second Anchor parameter values $PARAM_{x1}$, $PARAM_{x2}$, ..., $PARAM_{xM}$, and the second-second Anchor parameter value set 1122 includes second-second Anchor parameter values $PARAM_{y1}$, $PARAM_{y2}$, ..., $PARAM_{yM}$.

In step S1102, the first parameter value set 111 is generated based on the first-first Anchor parameter value set 1111, the first-second Anchor parameter value set 1121, and the ISO value 1011. Additionally, the second parameter value set 112 is generated based on the second-first Anchor parameter value set 1112, the second-second Anchor parameter value set 1122, and the obtained ISO value 1011. In one implementation, the first parameter value set 111 is generated by interpolating or extrapolating each parameter value of the first-first Anchor parameter value set 1111 and the first-second Anchor parameter value set 1121 based on the ISO value 1011, and the second parameter value set 112 is generated by interpolating or extrapolating each parameter value of the second-first Anchor parameter value set 1112 and the second-second Anchor parameter value set 1122 based on the ISO value 1011. For instance, assuming the ISO value 1011 is 250, the first Anchor ISO value 1110 is 200, and the second Anchor ISO value 1120 is 400, the ith parameter value $PARAM_{Ai}$ of the first parameter value set 111 can be calculated as:

$$\frac{(400-250)}{(400-200)} * PARAM_{Xi} + \frac{(250-200)}{(400-200)} * PARAM_{xi},$$

where i ranges from 1 to M. Similarly, the ith parameter value $PARAM_{Bi}$ of the second parameter value set 112 can be calculated as:

$$\frac{(400-250)}{(400-200)} * PARAM_{Yi} + \frac{(250-200)}{(400-200)} * PARAM_{yi},$$

where i ranging from 1 to M. For another instance, assuming the ISO value 1011 is 300, which happens to be the average value of the first Anchor ISO value 1110 (200) and the second Anchor ISO value 1120 (400), thus the ith parameter value $PARAM_{Ai}$ of the first parameter value set 111 will be the average value of $PARAM_{Xi}$ and $PARAM_{xi}$. Similarly, the ith parameter value $PARAM_{Bi}$ of the second parameter value set 112 will be the average value of $PARAM_{Yi}$ and $PARAM_{yi}$.

Figure 12:
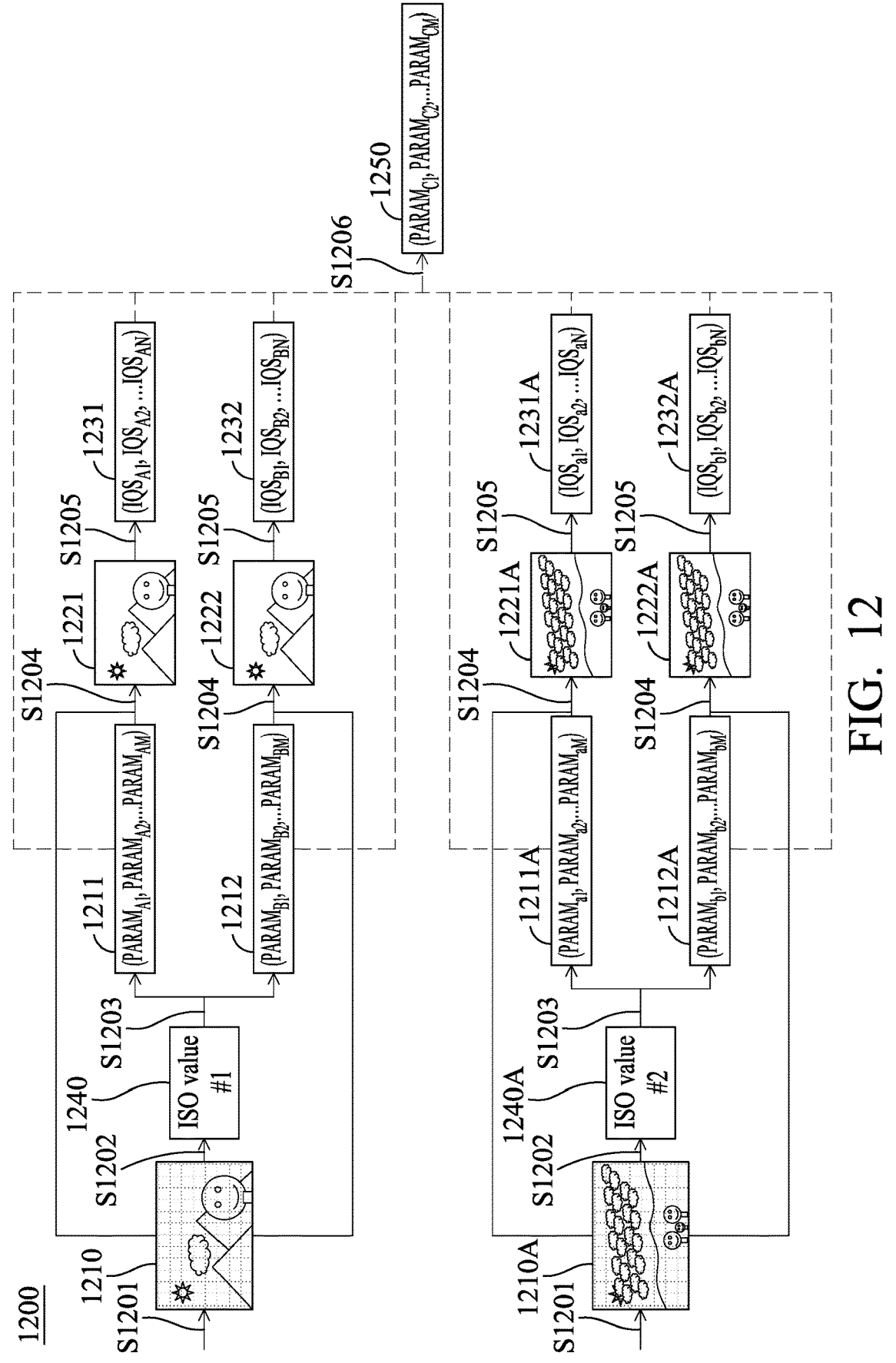
FIG. 12 is the schematic diagram of a method of tuning parameters for image signal processing, according to an embodiment of the present disclosure.

FIG. 12 is the schematic diagram of a method 1200 of tuning parameters for image signal processing, according to an embodiment of the present disclosure. In this embodiment, the parameter tuning process involves two different raw images, namely the raw image 1210 and the raw image 1210A, which have distinct content and different ISO values. The upper half of FIG. 12 is comparable to the method 1000 depicted in FIG. 10. The lower half of FIG. 12 outlines the symmetrical flow to the upper half, with the key difference being the utilization of the raw image 1210A instead of the raw image 1210. Consequently, the ISO value 1240A, the first parameter value set 1211A, the second parameter value set 1212A, the first rendered image 1221A, the second rendered image 1222A, the first image quality score set 1231A, and the second image quality score set 1232A all differ from their counterparts in the upper half, namely the ISO value 1240, the first parameter value set 1211, the second parameter value set 1212, the first rendered image 1221, the second rendered image 1222, the first image quality score set 1231, and the second image quality score set 1232, respectively. Further elaboration on each step will be provided below.

In step S1201, the raw image 1210 is captured. Additionally, the raw image 1210A is captured.

In step S1202, the ISO value 1240 for the raw image 1210 is obtained. Additionally, the ISO value 1240A for the raw image 1210A is obtained. In one implementation, the ISO values 1240 and 1240A are predetermined and stored as metadata before or during the image capture process. They are then retrieved from memory in step S1202. In another implementation, the ISO values 1240 and 1240A can be inferred in step S1202 by analyzing the features of the raw images 1210 and 1210A, respectively.

In step S1203, the first parameter value set 1211 and the second parameter value set 1212 are generated based on the obtained ISO value 1240. Additionally, the first parameter value set 1211A and the second parameter value set 1212A are generated based on the obtained ISO value 1240A. As shown in FIG. 12, the first parameter value set 1211 includes first parameter values $PARAM_{A1}$, $PARAM_{A2}$, ..., $PARAM_{AM}$ of M parameters. Likewise, the second parameter value set 1212 includes second parameter values $PARAM_{B1}$, $PARAM_{B2}$, ..., $PARAM_{BM}$ of the M parameters. Additionally, the first parameter value set 1211A includes first parameter values $PARAM_{a1}$, $PARAM_{a2}$, $PARAM_{aM}$ of the M parameters. Likewise, the second parameter value set 1212A includes second parameter values $PARAM_{b1}$, $PARAM_{b2}$, . . . , $PARAM_{bM}$ of the M parameters. These parameters may be used by various image processing algorithms, such as demosaicing, noise reduction (denoising), edge enhancement, etc. Each algorithm may utilize one or more of the M parameters, with each parameter potentially being used by one or more algorithms.

In step S1204, the first rendered image 1221 and the second rendered image 1222 are generated by rendering the raw image 1210 based on the first parameter value set 1211 and the second parameter value set 1212, respectively. Additionally, the first rendered image 1221A and the second rendered image 1222A are also generated by rendering the raw image 1210A based on the first parameter value set 1211A and the second parameter value set 1212A, respectively.

In step S1205, the first image quality score set 1231 and second image quality score set 1232 are calculated for the first rendered image 1221 and for the second rendered image 1222, respectively. Additionally, the first image quality score set 1231A and second image quality score set 1232A are calculated for the first rendered image 1221A and for the second rendered image 1222A, respectively. As shown in FIG. 12, the first image quality score set 1231 includes the first image quality scores $IQS_{A1}$, $IQS_{A2}$, . . . , $IQS_{AN}$ of N image quality indexes. Likewise, the second image quality score set 1232 includes the second image quality scores $IQS_{B1}$, $IQS_{B2}$, . . . , $IQS_{BN}$ of the N image quality indexes. Additionally, the first image quality score set 1231A includes the first image quality scores $IQS_{a1}$, $IQS_{a2}$, . . . , $IQS_{aN}$ of the N image quality indexes. Likewise, the second image quality score set 1232A includes the second image quality scores $IQS_{b1}$, $IQS_{b2}$, . . . , $IQS_{bN}$ of the N image quality indexes.

In step S1206, when generating the third parameter value set 1250, not only the first parameter value set 1211, the second parameter value set 1212, the first image quality score set 1231, and the second image quality score set 1232 are taken into account, but also the first parameter value set 1211A, the second parameter value set 1212A, the first image quality score set 1231A, and the second image quality score set 1232A are considered. In other words, the third parameter value set 1250 is generated based on a comprehensive consideration of the first parameter value sets 1211 and 1211A, the second parameter value sets 1212 and 1212A, the first image quality score sets 1231 and 1231A, and the second image quality score sets 1232 and 1232A.

Further implementations of step S1206 in FIG. 12 can evolve from the disclosed implementations of step S104. In one implementation, which evolves from the first implementation of step S104, the third parameter value $PARAM_{Ci}$ can be determined by comparing the image quality scores of the image quality index mapped to the ith parameter, identifying the best image quality score, and setting the corresponding parameter value accordingly. In another implementation, which evolves from the third implementation of step S104, the third parameter value $PARAM_{Ci}$ can be determined by calculating aggregated scores based on the image quality scores of the image quality indexes mapped to the ith parameter for each of the parameter sets 1231, 1232, 1231A, and 1232A, identifying the best aggregated score, and setting the corresponding parameter value accordingly. In yet another implementation, which evolves from the seventh implementation of step S104, the third parameter value $PARAM_{Ci}$ can be determined using a deep learning network that has been trained on a dataset containing multiple combinations of image quality score sets and their corresponding sets of parameter values.

Figure 13:
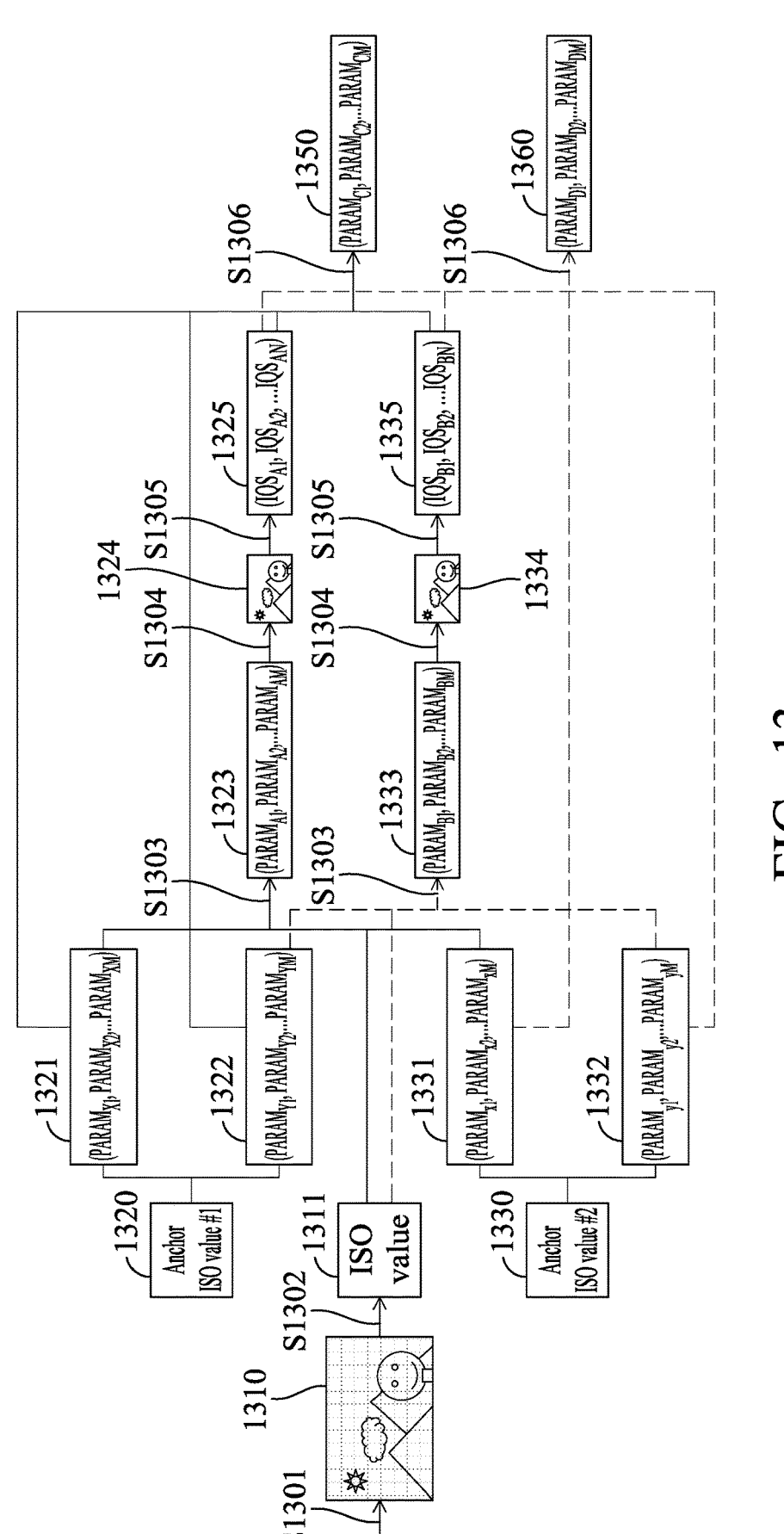
FIG. 13 is the schematic diagram of a method of tuning parameters for image signal processing, according to an embodiment of the present disclosure.

FIG. 13 is the schematic diagram of a method 1300 of tuning parameters for image signal processing, according to an embodiment of the present disclosure. As shown in FIG. 13, method 1300 includes steps S1301-S1306. The main difference between the method 1300 shown in FIG. 13 and the method 1000 shown in FIG. 10 is that instead of generating one set of third parameter value sets, two sets are generated. Additionally, these two parameter sets are derived based on the parameter sets corresponding to the Anchor ISO values, rather than the parameter sets used for generating the rendered images. Further details regarding each step will be provided below.

In step S1301, the raw image 1310 is captured.

In step S1302, the ISO value 1311 is obtained for the raw image 1310. In one implementation, the ISO value 1311 is predetermined and stored as metadata before or during the image capture process. It is then retrieved from memory in step S1302. In another implementation, the ISO value 1311 can be inferred in step S1302 by analyzing the features of the raw image 1310.

In step S1303, the first parameter value set 1323 is generated based on the first-first Anchor parameter value set 1321, the first-second Anchor parameter value set 1331, and the obtained ISO value 1311. Additionally, the second parameter value set 1333 is generated based on the second-first Anchor parameter value set 1322, the second-second Anchor parameter value set 1332, and the obtained ISO value 1311.

As shown in FIG. 13, the first Anchor ISO value 1320 corresponds to the first-first Anchor parameter value set 1321 and the second-first Anchor parameter value set 1322, and the second Anchor ISO value 1330 corresponds to the first-second Anchor parameter value set 1331 and the second-second Anchor parameter value set 1332. Additionally, the first parameter value set 1323 includes first parameter values $PARAM_{A1}$, $PARAM_{A2}$, . . . , $PARAM_{AM}$ of M parameters, where M is a positive integer larger than one. Likewise, the second parameter value set 1333 includes second parameter values $PARAM_{B1}$, $PARAM_{B2}$, . . . , $PARAM_{BM}$ of the M parameters. Moreover, the first-first Anchor parameter value set 1321 includes first-first Anchor parameter values $PARAM_{X1}$, $PARAM_{X2}$, . . . , $PARAM_{XM}$ of the M parameters. Likewise, the second-first Anchor parameter value set 1322 includes second-first Anchor parameter values $PARAM_{Y1}$, $PARAM_{Y2}$, . . . , $PARAM_{YM}$, the first-second Anchor parameter value set 1331 includes first-second Anchor parameter values $PARAM_{x1}$, $PARAM_{x2}$, . . . , $PARAM_{xM}$, and the second-second Anchor parameter value set 1332 includes second-second Anchor parameter values $PARAM_{y1}$, $PARAM_{y2}$, . . . . $PARAM_{yM}$. Furthermore, the Anchor ISO values 1320 and 1330 can be determined based on the ISO value 1311. For instance, if the ISO value 1311 is 250, and the camera system only has parameter sets for Anchor ISO values of 100, 200, 400, 600, and 800, the first Anchor ISO value 1320 and the second Anchor ISO value 1330 would be 200 and 400, respectively, because 200 and 400 are the two closest values to 250 among the available Anchor ISO values of 100, 200, 400, 600, and 800.

Further implementations of step S1303 can evolve from the disclosed implementations of step S1102. In one implementation, the first parameter value set 1323 is generated by interpolating or extrapolating each parameter value of the first-first Anchor parameter value set 1321 and the first-second Anchor parameter value set 1331 based on the ISO value 1311, and the second parameter value set 1333 is generated by interpolating or extrapolating each parameter value of the second-first Anchor parameter value set 1322 and the second-second Anchor parameter value set 1332 based on the ISO value 1311. For instance, assuming the ISO value 1311 is 250, the first Anchor ISO value 1320 is 200, and the second Anchor ISO value 1330 is 400, the ith parameter value $PARAM_{Ai}$ of the first parameter value set 1323 can be calculated as:

$$\frac{(400-250)}{(400-200)}*PARAM_{Xi}+\frac{(250-200)}{(400-200)}*PARAM_{xi},$$

where i ranges from 1 to M. Similarly, the ith parameter value $PARAM_{Bi}$ of the second parameter value set 1333 can be calculated as:

$$\frac{(400-250)}{(400-200)}*PARAM_{Yi}+\frac{(250-200)}{(400-200)}*PARAM_{yi},$$

where i ranging from 1 to M. For another instance, assuming the ISO value 1311 is 300, which happens to be the average value of the first Anchor ISO value 1320 (200) and the second Anchor ISO value 1330 (400), thus the ith parameter value $PARAM_{Ai}$ of the first parameter value set 1323 will be the average value of $PARAM_{Xi}$ and $PARAM_{xi}$. Similarly, the ith parameter value $PARAM_{Bi}$ of the second parameter value set 1333 will be the average value of $PARAM_{Yi}$ and $PARAM_{yi}$.

In step S1304, the first rendered image 1324 is generated by rendering the raw image 1310 based on the first parameter value set 1323 generated in step S1303, and the second rendered image 1334 is generated by rendering the raw image 1310 based on the second parameter value set 1333 generated in step S1303.

In step S1305, the first image quality score set 1325 is calculated for the first rendered image 1324, and the second image quality score set 1335 is calculated for the second rendered image 1334. As shown in FIG. 13, the first image quality score set 1325 includes the first image quality scores $IQS_{A1}$, $IQS_{A2}$, . . . , $IQS_{AN}$ of N image quality indexes. Likewise, the second image quality score set 1335 includes the second image quality scores $IQS_{B1}$, $IQS_{B2}$, . . . , $IQS_{BN}$ of the N image quality indexes.

In step S1306, the third-first Anchor parameter value set 1350 is generated based on the first-first Anchor parameter value set 1321, the second-first Anchor parameter value set 1322, the first image quality score set 1325, and the second image quality score set 1335. Additionally, the third-second Anchor parameter value set 1360 is generated based on the first-second Anchor parameter value set 1331, the second-second Anchor parameter value set 1332, the first image quality score set 1325, and the second image quality score set 1335. The third-first Anchor parameter value set 1350 corresponds to the first Anchor ISO value 1320, while the third-second Anchor parameter value set 1360 corresponds to the second Anchor ISO value 1330. Consequently, the third-first Anchor parameter value set 1350 and the third-second Anchor parameter value set 1360 become the updated parameter value sets mapped to the Anchor ISO values 1320 and 1330, respectively. These updated sets can be utilized to determine the optimal parameter settings for rendering images with specific ISO values.

Further implementations of step S1306 in FIG. 13 can evolve from the disclosed implementations of step S104. In one implementation, the third-first Anchor parameter value set 1350 is generated by interpolating or extrapolating each parameter value of the first-first Anchor parameter value set 1321 and the second-first Anchor parameter value set 1322 based on the first image quality score set 1325 and the second image quality score set 1335. Additionally, the third-second Anchor parameter value set 1360 is generated by interpolating or extrapolating each parameter value of the first-second Anchor parameter value set 1331 and the second-second Anchor parameter value set 1332 based on the first image quality score set 1325 and the second image quality score set 1335. The interpolation or extrapolation can involve the use of the optimization algorithm, which has been described above and will not be reiterated.

In an embodiment, the parameter tuning process involves two different raw images which have distinct content and different ISO values. Specifically, step S1302 may include obtaining another ISO value for another raw image. Additionally, another pair of the first and second parameter value sets, another pair of the first and second rendered images, and another pair of the first and second image quality score sets, will be derived from the subsequent steps S1303-S1305, respectively. In step S1306, said another pair of the first and second image quality score sets will be taken into account when generating the third-first parameter value set 1350 and the third-second parameter value set 1360.

Figure 14:
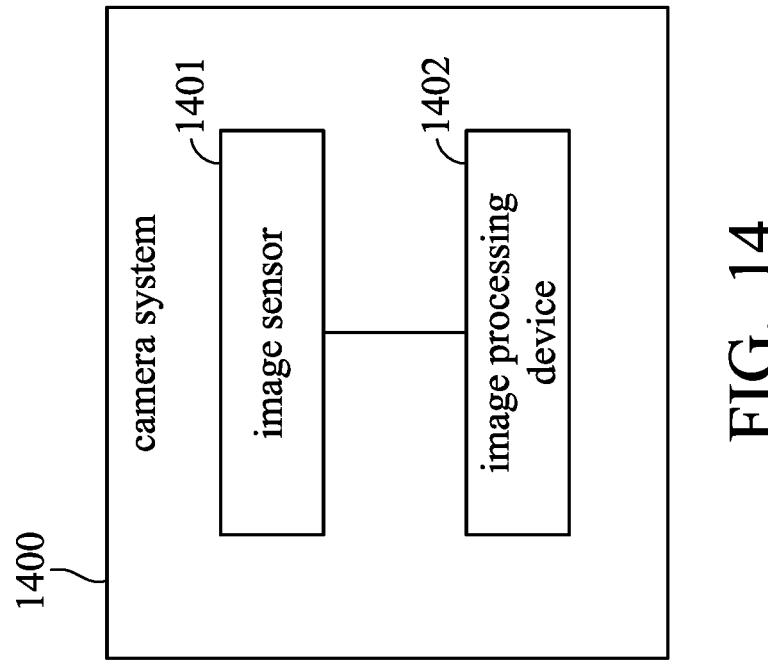
FIG. 14 is the system block diagram of a camera system, according to an embodiment of the present disclosure.

FIG. 14 is the system block diagram of a camera system 1400, according to an embodiment of the present disclosure. As shown in FIG. 14, the camera system 1400 may include an image sensor 1401 and an image processing device 1402.

The camera system 1400 can be any electronic apparatus with photography and imaging functions, such as a variety of cameras and mobile devices. In embodiments the present disclosure, the camera system 1400 uses the method 100 to tune parameters for image signal processing.

The image sensor 1401 can be implemented by, for example, a charge-coupled device (CCD) or a complementary metal-oxide-semiconductor (CMOS), to convert the optical signal received from a plurality of lenses into electrical signals. In embodiments the present disclosure, the image sensor is configured to execute step S101 of the method 100, step S1201 of the method 1200, or step S1301 of the method 1300, that is, to capture a raw image.

The image processing device 1402 can be a general-purpose processing unit or special-purpose hardware circuitry. In an embodiment, the image processing device 1402 can be a general-purpose processor, a microprocessor, or a microcontroller loading a program or an instruction set from a storage unit (including volatile and non-volatile memories) of the camera system 1400 to execute steps S102-S104 of the method 100, steps S1202-S1206 of the method 1200, or steps S1302-S1306 of the method 1300. In another embodiment, the image processing device 1402 may include one or more integrated circuits, such as application-specific integrated circuits (ASIC) and/or field programmable gate arrays (FPGA), dedicated to execute the steps S102-S104 of the method 100, steps S1202-S1206 of the method 1200, or steps S1302-S1306 of the method 1300.

An objective of the present disclosure is to provide schemes, concepts, designs, techniques, methods and apparatus pertaining to tuning parameters for image signal processing. By implementing the techniques described in the present disclosure, benefits of more balanced and visually appealing images across a variety of different scenes and lighting conditions can be achieved.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera system, comprising:

an image sensor, configured to execute step (i), capturing at least one raw image; and an image processing device, connected to the image sensor, and configured to receive the raw image from the image sensor and execute the following steps:

(ii) generating a first rendered image by rendering the raw image based on a first parameter value set, and generating a second rendered image by rendering the raw image based on a second parameter value set, wherein the first parameter value set includes first parameter values of multiple parameters, and the second parameter value set includes second parameter values of the parameters;

(iii) calculating a first image quality score set for the first rendered image, and calculating a second image quality score set for the second rendered image, wherein the first image quality score set includes first image quality scores of one or more image quality indexes, and the second image quality score set includes second image quality scores of the image quality indexes; and (iv) generating a third parameter value set based on the first parameter value set, the second parameter value set, the first image quality score set, and the second image quality score set, wherein the third parameter value set includes third parameter values of the parameters.

2. The camera system as claimed in 1, wherein each parameter is mapped to only one of the image quality indexes, and step (iv) further comprises:

for each of the parameters, determining whether to set the third parameter value equal to the first parameter value or the second parameter value of the parameter by comparing the first image quality score and the second image quality score of said only one image quality index.

3. The camera system as claimed in 1, wherein each parameter is mapped to one or more of the image quality indexes, and step (iv) further comprises:

for each of the parameters, calculating an estimated value by using an optimization algorithm to interpolate or extrapolate the first parameter value and the second parameter value based on the first image quality score set and the second image quality score set; and setting the third parameter value equal to the estimated value.

4. The camera system as claimed in 1, wherein each parameter is mapped to one or more of the image quality indexes, and step (iv) further comprises:

for each of the parameters, calculating a first aggregated score based on one or more of the first image quality scores of the image quality indexes mapped to the parameter, and calculating a second aggregated score based on one or more of the second image quality scores of the image quality indexes mapped to the parameter; and determining whether to set the third parameter value equal to the first parameter value or the second parameter value of the parameter by comparing the first aggregated score and the second aggregated score.

5. The camera system as claimed in 1, wherein each parameter is mapped to one or more of the image quality indexes, and step (iv) further comprises:

for each of the parameters, checking a mapping table to determine whether the parameter is mapped to only one of the image quality indexes, wherein the mapping table is associated with mappings between the image quality indexes and the parameters;

in response to the parameter being mapped to said only one image quality index, determining whether to set the third parameter value equal to the first parameter value or the second parameter value of the parameter by comparing the first image quality score and the second image quality score of said only one image quality index; and in response to the parameter being mapped to multiple of the image quality indexes, calculating an estimated value by using an optimization algorithm to interpolate or extrapolate the first parameter value and the second parameter value based on the first image quality score set and the second image quality score set, and setting the third parameter value equal to the estimated value.

6. The camera system as claimed in 1, wherein step (iv) further comprises:

generating a series of parameter value sets based on the first parameter value set and the second parameter value set, wherein the series of parameter value sets comprises possible combinations of selecting one parameter value from each of the first parameter value set and the second parameter value set for each of the parameters;

generating a series of rendered images by rendering the raw image based on the series of parameter value sets;

calculating a series of image quality score sets for the series of rendered images, and determining the best image quality score set from the first image quality score set, the second image quality score set, and the series of image quality score sets;

selecting a fourth parameter value set that was used to generate the rendered image having the best image quality score set, from the first parameter value set, the second parameter value set, and the series of parameter value sets; and for each of the parameters, setting the third parameter value equal to the fourth parameter value.

7. The camera system as claimed in 1, wherein step (iv) further comprises:

generating a series of parameter value sets based on the first parameter value set and the second parameter value set, wherein the series of parameter value sets comprises possible combinations of selecting one parameter value from each of the first parameter value set and the second parameter value set for each of the parameters;

generating a series of rendered images by rendering the raw image based on the series of parameter value sets;

calculating a series of image quality score sets for the series of rendered images, and determining the best image quality score set from the first image quality score set, the second image quality score set, and the series of image quality score sets;

selecting a fourth parameter value set that was used to generate the rendered image having the best image quality score set in the series of image quality score sets, from the first image quality score set, the second image quality score set, and the series of parameter value sets;

for each of the parameters, setting the third parameter value equal to the fourth parameter value if the fourth parameter value of the parameter belongs to a majority of the fourth parameter values in the fourth parameter value set that derives from the first parameter value set or the second parameter value set, and setting the third parameter value equal to an estimated value if the fourth parameter value of the parameter does not belong to the majority in the fourth parameter value set.

8. The camera system as claimed in 7, wherein step (iv) further comprises:

calculating the estimated value by using an optimization algorithm to interpolate or extrapolate the first parameter value and the second parameter value based on the first image quality score set and the second image quality score set.

9. The camera system as claimed in 1, wherein step (iv) further comprises:

for each of the parameters, using a deep learning network to determine whether to set the third parameter value equal to the first parameter value or the second parameter value, or to set the third parameter value equal to an estimated value, based on the first parameter value set, the second parameter value set, the first image quality score set and the second image quality score set.

10. The camera system as claimed in 1, wherein step (iv) further comprises:

calculating the estimated value by using an optimization algorithm to interpolate or extrapolate the first parameter value and the second parameter value based on the first image quality score set and the second image quality score set.

11. The camera system as claimed in 1, wherein the image quality indexes comprise one or more of noise, texture, tone, contrast, dynamic range, color, brightness, artifact, and temporal quality.

12. The camera system as claimed in 1, wherein the image processing device is further configured to:

generate a third rendered image by rendering the raw image based on the third parameter value set;

calculate a third image quality score set for the third rendered image; and calculate a first overall score for the first rendered image, a second overall score for the second rendered image, and a third overall score for the third rendered image, based on the first image quality score set, the second image quality score set, and the third image quality score set, respectively;

determine whether to iterate steps (ii)-(iv) based on the first overall score, the second overall score, and the third overall score.

13. The camera system as claimed in 1, wherein the image processing device is further configured to render another raw image based on the third parameter value set.

14. The camera system as claimed in 1, wherein the image processing device is further configured to obtain an ISO value for the raw image, and generate the first parameter value set and the second parameter value set based on the obtained ISO value.

15. The camera system as claimed in 14, wherein the image processing device is further configured to generate the first parameter value set and the second parameter value set by executing steps comprising:

determining a first Anchor ISO value and a second Anchor ISO value based on the obtained ISO value, wherein the first Anchor ISO value corresponds to a first-first Anchor parameter value set and a second-first Anchor parameter value set, and the second Anchor ISO value corresponds to a first-second Anchor parameter value set and a second-second Anchor parameter value set; and generating the first parameter value set by interpolating or extrapolating each parameter value of the first-first Anchor parameter value set and the first-second Anchor parameter value set based on the obtained ISO value, and generating the second parameter value set by interpolating or extrapolating each parameter value of the second-first Anchor parameter value set and the second-second Anchor parameter value set based on the obtained ISO value.

16. The camera system as claimed in 14, wherein the image processing device is further configured to:

obtain another ISO value for another raw image; and calculate another first parameter value set and another second parameter value set based on the obtained another ISO value;

wherein step (ii) further comprises generating another first rendered image by rendering said another raw image based on said another first parameter value set, and generating another second rendered image by rendering said another raw image based on said another second parameter value set;

wherein step (iii) further comprises calculating another first image quality score set for said another first rendered image, and calculating another second image quality score set for said another second rendered image; and wherein step (iv) further comprises generating the third parameter value set based on the first parameter value set, the second parameter value set, the first image quality score set, the second image quality score set, said another first parameter value set, said another second parameter value set, said another first image quality score set, and said another second image quality score set.

17. A camera system, comprising:

an image sensor, configured to execute step (i), capturing at least one raw image; and an image processing device, connected to the image sensor, and configured to receive the raw image from the image sensor and execute the following steps:

(ii) obtaining an ISO value for the raw image;

(iii) generating a first parameter value set by interpolating or extrapolating each parameter value of a first-first Anchor parameter value set and a first-second Anchor parameter value set based on the obtained ISO value, and generating a second parameter value set by interpolating or extrapolating each parameter value of a second-first Anchor parameter value set and a second-second Anchor parameter value set based on the obtained ISO value, wherein the first-first Anchor parameter value set and a second-first Anchor parameter value set correspond to a first Anchor ISO value, and wherein the first-second Anchor parameter value set and the second-second Anchor parameter value set correspond to a second Anchor ISO value;

(iv) generating a first rendered image by rendering the raw image based on the first parameter value set, and generating a second rendered image by rendering the raw image based on the second parameter value set;

(v) calculating a first image quality score set for the first rendered image, and calculating a second image quality score set for the second rendered image; and (vi) generating a third-first Anchor parameter value set by interpolating or extrapolating each parameter value of the first-first Anchor parameter value set and the second-first Anchor parameter value set based on the first image quality score set and the second image quality score set, and generating a third-second Anchor parameter value set by interpolating or extrapolating each parameter value of the first-second Anchor parameter value set and the second-second Anchor parameter value set based on the first image quality score set and the second image quality score set, wherein the third-first Anchor parameter value set corresponds to the first Anchor ISO value, and the third-second Anchor parameter value set corresponds to the second Anchor ISO value.

18. The camera system as claimed in 17, wherein step (ii) further comprises obtaining another ISO value for another raw image;

wherein step (iii) further comprises generating another first parameter value set by interpolating or extrapolating each parameter value of the first-first Anchor parameter value set and the first-second Anchor parameter value set based on said another obtained ISO value, and generating another second parameter value set by interpolating or extrapolating each parameter value of the second-first Anchor parameter value set and the second-second Anchor parameter value set based on said another obtained ISO value;

wherein step (iv) further comprises generating another first rendered image by rendering said another raw image based on said another first parameter value set, and generating another second rendered image by rendering said another raw image based on said another second parameter value set;

wherein step (v) further comprises calculating another first image quality score set for said another first rendered image, and calculating another second image quality score set for said another second rendered image;

wherein step (vi) further comprises generating the third-first Anchor parameter value set by interpolating or extrapolating each parameter value of the first-first Anchor parameter value set and the second-first Anchor parameter value set based on the first image quality score set, the second image quality score set, said another first image quality score set, and said another second image quality score set, and generating the third-second Anchor parameter value set by interpolating or extrapolating each parameter value of the first-second Anchor parameter value set and the second-second Anchor parameter value set based on the first image quality score set, the second image quality score set, said another first image quality score set, and said another second image quality score set.

* * * * *